(12) United States Patent
Mori et al.

(10) Patent No.: US 11,897,467 B2
(45) Date of Patent: Feb. 13, 2024

(54) VEHICLE DRIVING ASSIST APPARATUS

(71) Applicant: TOYOTA JIDOSHA KABUSHIKI KAISHA, Toyota (JP)

(72) Inventors: Takeki Mori, Nagoya (JP); Yuki Yamaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 17/518,839

(22) Filed: Nov. 4, 2021

(65) Prior Publication Data

US 2022/0219696 A1 Jul. 14, 2022

(30) Foreign Application Priority Data

Jan. 13, 2021 (JP) ................. 2021-003612

(51) Int. Cl.
*B60W 30/16* (2020.01)
*B60W 30/14* (2006.01)
*B60W 40/04* (2006.01)
*B60W 50/12* (2012.01)
*B60W 50/00* (2006.01)

(52) U.S. Cl.
CPC ........ *B60W 30/162* (2013.01); *B60W 30/146* (2013.01); *B60W 40/04* (2013.01); *B60W 50/12* (2013.01); *B60W 2050/0083* (2013.01); *B60W 2554/406* (2020.02); *B60W 2554/801* (2020.02);
(Continued)

(58) Field of Classification Search
CPC ...... B60W 10/06; B60W 10/18; B60W 10/20; B60W 30/146; B60W 30/18163; B60W 40/04; B60W 2050/0083; B60W 2552/10; B60W 2552/53; B60W 2554/4041; B60W 2554/4045; B60W 2554/406; B60W 2554/80; B60W 2554/801; B60W 2554/802; B60W 2554/803; B60W 2554/804; B60W 2754/30

See application file for complete search history.

(56) References Cited

U.S. PATENT DOCUMENTS

2018/0154894 A1* 6/2018 Norwood .............. B60W 30/09
2019/0152386 A1* 5/2019 McQuillen ............ B60K 35/00
(Continued)

FOREIGN PATENT DOCUMENTS

JP 2015-143970 A 8/2015
JP 2020-015480 A 1/2020

*Primary Examiner* — Peter D Nolan
*Assistant Examiner* — Ce Li Li
(74) *Attorney, Agent, or Firm* — Sughrue Mion, PLLC

(57) ABSTRACT

A vehicle driving assist apparatus suspends executing a following moving control and starts executing a process of measuring an elapsing time which elapses since suspending executing the following moving control when a control suspending condition that a driver of an own vehicle carries out an accelerating operation of accelerating the own vehicle in order to pass the next lane preceding vehicle, becomes satisfied, resets the elapsing time and start measuring the elapsing time which elapses since resetting the elapsing time when the own vehicle has passed the next lane preceding vehicle before the elapsing time reaches a predetermined time, and restarts executing the following moving control when a control restarting condition that the elapsing time reaches the predetermined time, is satisfied.

7 Claims, 14 Drawing Sheets

(52) U.S. Cl.
CPC . *B60W 2554/802* (2020.02); *B60W 2554/803* (2020.02); *B60W 2554/804* (2020.02)

(56) References Cited

U.S. PATENT DOCUMENTS

2019/0276029 A1* 9/2019 Umeda ................ G06V 20/582
2022/0105936 A1* 4/2022 Watanabe ............. B60W 10/20

* cited by examiner

VEHICLE DRIVING ASSIST APPARATUS

CROSS REFERENCE TO RELATED APPLICATIONS

This application claims priority to Japanese Patent Application No. 2021-003612 filed Jan. 13, 2021, the entire contents of which are incorporated herein by reference.

BACKGROUND

Field

The invention relates to a vehicle driving assist apparatus.

Description of the Related Art

There is known a vehicle driving assist apparatus which executes a following moving control. The following moving control is a control of autonomously controlling a moving speed of an own vehicle so as to move the own vehicle, following a preceding vehicle. As such a vehicle driving assist apparatus, there is known a vehicle driving assist apparatus which is configured to suspend executing the following moving control when the vehicle driving assist apparatus detects that a driver of the own vehicle is passing (or overtaking) a next lane preceding vehicle while the vehicle driving assist apparatus is executing the following moving control (for example, see JP 2015-143970 A). The next lane preceding vehicle is a vehicle which moves in a lane next to a lane in which the own vehicle moves.

The known vehicle driving assist apparatus determines that the driver of the own vehicle is passing the next lane preceding vehicle in response to the driver pressing an accelerator pedal. Then, the known vehicle driving assist apparatus restarts executing the following moving control when the own vehicle has passed the next lane preceding vehicle or when a predetermined time elapses since the known vehicle driving assist apparatus suspends executing the following moving control.

According to the known vehicle driving assist apparatus, an execution of the following moving control is suspended when (i) a traffic congestion of the next lane preceding vehicles occurs, and (ii) the driver of the driver presses the accelerator pedal to pass the next lane preceding vehicles. In this case, if the driver stops pressing accelerator pedal before the own vehicle has passed the first next lane preceding vehicle, the execution of the following moving control is restarted. As a result, the moving speed of the own vehicle is considerably decreased. In this case, the driver of the own vehicle needs to considerably accelerate the own vehicle and increase the moving speed of the own vehicle in order to pass the first next lane preceding vehicle. Thus, the own vehicle cannot smoothly pass the first next lane preceding vehicle.

Further, if the driver of the own vehicle temporarily stops an operation of accelerating the own vehicle when the own vehicle has passed the first next lane preceding vehicle, the execution of the following moving control is restarted. As a result, the moving speed of the own vehicle is considerably decreased. Thus, the own vehicle cannot smoothly pass the second next lane preceding vehicle.

SUMMARY

An object of the invention is to provide a vehicle driving assist apparatus which can allows the own vehicle to smoothly pass the next lane preceding vehicles while the vehicle driving assist apparatus is executing the following moving control.

A vehicle driving assist apparatus according to the invention comprises an electronic control unit. The electronic control unit (i) executes a following moving control of executing a process of detecting a next lane preceding vehicle which moves ahead of an own vehicle in a lane next to a lane in which the own vehicle moves, and (ii) autonomously controlling a moving speed of the own vehicle so as to maintain a distance between the next lane preceding vehicle and the own vehicle at a predetermined next lane inter-vehicle distance.

The electronic control unit is configured to suspend executing the following moving control and starts executing a process of measuring an elapsing time which elapses since the electronic control unit suspends executing the following moving control when a control suspending condition that a driver of the own vehicle carries out an accelerating operation of accelerating the own vehicle in order to pass the next lane preceding vehicle, becomes satisfied.

Further, the electronic control unit is configured to reset the elapsing time and start measuring the elapsing time which elapses since the electronic control unit resets the elapsing time when the own vehicle has passed the next lane preceding vehicle before the elapsing time reaches a predetermined time.

Further, the electronic control unit is configured to restart executing the following moving control when a control restarting condition that the elapsing time reaches the predetermined time, is satisfied.

If the vehicle driving assist apparatus is configured to (i) suspend executing the following moving control in response to the accelerating operation being carried out and (ii) restart executing the following moving control in response to the accelerating operation being stopped, the execution of the following moving control is restarted when the accelerating operation is temporarily stopped before the own vehicle has passed the next lane preceding vehicle after the driver of the own vehicle starts the accelerating operation to pass the next lane preceding vehicle. In this case, the moving speed of the own vehicle is considerably decreased. Thus, the driver needs to considerably accelerate the own vehicle and increase the moving speed of the own vehicle in order to pass the next lane preceding vehicle. Thus, the driver of the own vehicle cannot smoothly pass the next lane preceding vehicle.

Further, when the driver of the own vehicle starts the accelerating operation to pass the next lane preceding vehicles, and then temporarily stops the accelerating operation when the own vehicle has passed the first next lane preceding vehicle, the execution of the following moving control is restarted. As a result, the moving speed of the own vehicle is considerably decreased. Thus, the driver cannot move the own vehicle to smoothly pass the second next lane preceding vehicle.

The vehicle driving assist apparatus according to the invention does not restart executing the following moving control as far as the predetermined time elapses even when the driver of the own vehicle temporarily stops the accelerating operation before the own vehicle has passed the next lane preceding vehicle after the driver starts the accelerating operation to pass the next lane preceding vehicle. Thus, the moving speed of the own vehicle is not considerably decreased. Thus, the driver of the own vehicle can move the own vehicle to smoothly pass the next lane preceding vehicle.

In addition, the vehicle driving assist apparatus according to the invention (i) resets the elapsing time when the own vehicle has passed the first next lane preceding vehicle, and then (ii) starts measuring the elapsing time. Thus, even when the driver of the own vehicle temporarily stops the accelerating operation when the own vehicle has passed the first next lane preceding vehicle, the execution of the following moving control is not restarted. Thus, the moving speed of the own vehicle is not considerably decreased. Thus, the driver of the own vehicle can move the own vehicle to smoothly pass the second next lane preceding vehicle.

According to an aspect of the invention, the control suspending condition may include a condition that (i) the own vehicle moves in a cruising lane, and (ii) the next lane preceding vehicle moves in a passing lane.

For example, there may be a situation that (i) the own vehicle moves in the cruising lane, (ii) a traffic congestion of the next lane preceding vehicles occurs in the passing lane next to the cruising lane, and thus the next lane preceding vehicles stop or move at a low speed, and (iii) no traffic congestion occurs in the cruising lane. If the following moving control is being executed in that situation, the own vehicle moves, following the next lane preceding vehicle which stops or moves at a low speed. Thus, a traffic congestion may occur in the cruising lane.

The vehicle driving assist apparatus according to this aspect of the invention suspends executing the following moving control when the driver of the own vehicle carries out the accelerating operation to move the own vehicle to pass the next lane preceding vehicles in the situation that (i) the own vehicle moves in the cruising lane, (ii) a traffic congestion of the next lane preceding vehicles occurs in the passing lane next to the cruising lane, and thus the next lane preceding vehicles stop or move at a low speed, and (iii) no traffic congestion occurs in the cruising lane. The execution of the suspended following moving control is held suspended for the predetermined time even when the own vehicle has passed the first next lane preceding vehicle. Thus, the driver of the own vehicle can move the own vehicle to pass the second next lane preceding vehicle without carrying out the bothersome accelerating operation of stopping pressing the accelerator pedal once and pressing the accelerator pedal again. Thus, the driver of the own vehicle can move the own vehicle to pass the next lane preceding vehicles moving in the passing lane having a traffic congestion without carrying out the bothersome accelerating operation.

According to another aspect of the invention, the control suspending condition may include a condition that a traffic congestion of the next lane preceding vehicles occurs.

With this aspect of the invention, the execution of the following moving control can be suspended only when (i) the following moving control is being executed, (ii) the driver of the own vehicle carries out the accelerating operation, and (iii) the traffic congestion of the next lane preceding vehicles occurs.

According to further another aspect of the invention, the control restarting condition may include a condition that the accelerating operation is not carried out.

With this aspect of the invention, the execution of the following moving control can be restarted only when the driver of the own vehicle predictively does not have an intention to accelerate the own vehicle at a point of time when the predetermined time elapses.

According to further another aspect of the invention, the electronic control unit may be configured to execute a process of detecting an own lane preceding vehicle which moves ahead of the own vehicle in the lane in which the own vehicle moves when the electronic control unit is executing the following moving control. In this case, the electronic control unit may be configured to execute the following moving control to autonomously control the moving speed of the own vehicle so as to maintain a distance between the own lane preceding vehicle and the own vehicle at a predetermined own lane inter-vehicle distance when (i) there is not the next lane preceding vehicle, and (ii) there is the own lane preceding vehicle.

With this aspect of the invention, the own vehicle can be autonomously moved, following the own lane preceding vehicle by the following moving control when (i) there is not the next lane preceding vehicle, and (ii) there is the own lane preceding vehicle.

According to further another aspect of the invention, the electronic control unit may be configured to execute a process of detecting an own lane preceding vehicle which moves ahead of the own vehicle in the lane in which the own vehicle moves when the electronic control unit is executing the following moving control. In this case, the electronic control unit may be configured to execute the following moving control to autonomously accelerate the own vehicle when (i) there is the next lane preceding vehicle, (ii) there is the own lane preceding vehicle, (iii) a distance between the own lane preceding vehicle and the own vehicle is longer than a predetermined own lane inter-vehicle distance, and (iv) the distance between the next lane preceding vehicle and the own vehicle is longer than the predetermined next lane inter-vehicle distance. In this case, the electronic control unit may be configured to execute the following moving control to autonomously decelerate the own vehicle when (i) there is the next lane preceding vehicle, (ii) there is the own lane preceding vehicle, and (iii) the distance between the own lane preceding vehicle and the own vehicle is shorter than the predetermined own lane inter-vehicle distance, or (iv) the distance between the next lane preceding vehicle and the own vehicle is shorter than the predetermined next lane inter-vehicle distance.

With this aspect of the invention, the own vehicle can be autonomously moved, following the next lane preceding vehicle or the own lane preceding vehicle by the following moving control when there are the next lane preceding vehicle and the own lane preceding vehicle.

According to further another aspect of the invention, the control suspending condition may include a condition that the own vehicle moves on an express highway.

With this aspect of the invention, the execution of the following moving control can be suspended only when the own vehicle moves on the express highway.

Elements of the invention are not limited to elements of embodiments and modified examples of the invention described along with the drawings. The other objects, features and accompanied advantages of the invention can be easily understood from the embodiments and the modified examples of the invention.

DESCRIPTION OF THE EMBODIMENTS

Figure 1:
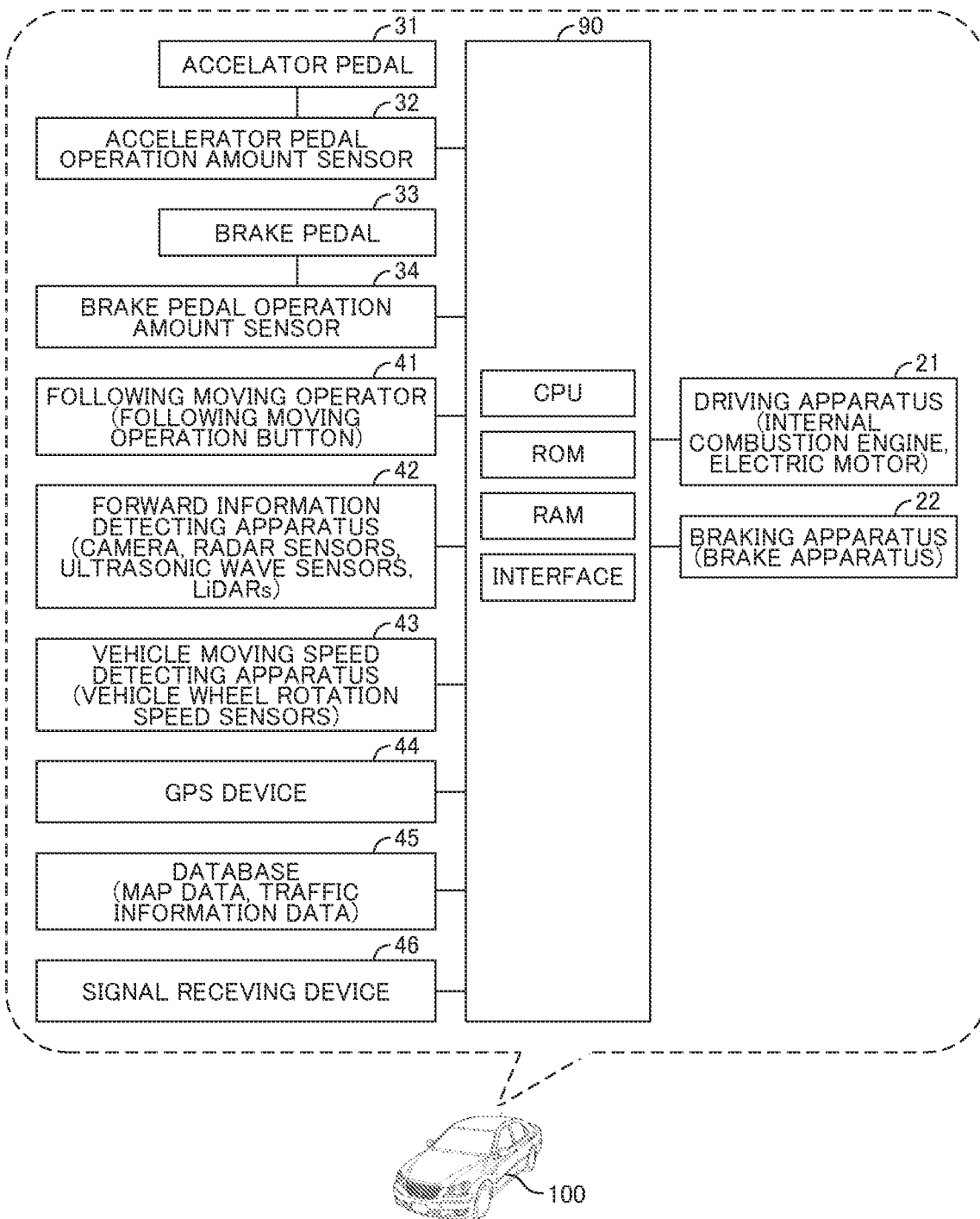
FIG. 1 is a view which shows a vehicle driving assist apparatus according to an embodiment of the invention and a vehicle (an own vehicle) to which the vehicle driving assist apparatus is applied.

Below, a vehicle driving control apparatus according to an embodiment of the invention will be described with reference to the drawings. FIG. 1 shows the vehicle driving assist apparatus 10 according to the embodiment of the invention. The vehicle driving assist apparatus 10 is installed on an own vehicle 100.

<ECU>

The vehicle driving assist apparatus 10 includes an ECU 90. ECU stands for electronic control unit. The ECU 90 includes a micro-computer as a main component. The micro-computer includes a CPU, a ROM, a RAM, a non-volatile memory, and an interface. The CPU realizes various functions by executing instructions or programs or routines memorized in the ROM.

<Driving Apparatus and Etc.>

A driving apparatus 21 and a braking apparatus 22 are installed on the own vehicle 100.

<Driving Apparatus>

The driving apparatus 21 is an apparatus which applies a driving force to the own vehicle 100 to move the own vehicle 100. The driving apparatus 21 is, for example, an internal combustion engine and at least one electric motor. The driving apparatus 21 is electrically connected to the ECU 90. The ECU 90 can control the driving force applied to the own vehicle 100 by controlling activations of the driving apparatus 21.

<Braking Apparatus>

The braking apparatus 22 is an apparatus which applies a braking force to the own vehicle 100 to brake the own vehicle 100. The braking apparatus 22 is, for example, a brake apparatus. The braking apparatus 22 is electrically connected to the ECU 90. The ECU 90 can control the braking force applied to the own vehicle 100 by controlling activations of the braking apparatus 22.

<Forward Information Detecting Apparatus and Etc.>

Further, an accelerator pedal 31, an accelerator pedal operation amount sensor 32, a brake pedal 33, a brake pedal operation amount sensor 34, a following moving operator 41, a forward information detecting apparatus 42, a vehicle moving speed detecting apparatus 43, a GPS device, a database 45, and a signal receiving device 46 are installed on the own vehicle 100.

<Accelerator Pedal Operation Amount Sensor>

The accelerator pedal operation amount sensor 32 is electrically connected to the ECU 90. The accelerator pedal operation amount sensor 32 detects an operation amount of the accelerator pedal 31 and sends information on the detected operation amount to the ECU 90. The ECU 90 acquires the operation amount of the accelerator pedal 31 as an accelerator pedal operation amount AP, based on the information sent from the accelerator pedal operation amount sensor 32.

When the accelerator pedal operation amount AP is greater than zero, the ECU 90 calculates a requested acceleration Greq, based on the accelerator pedal operation amount AP. In other words, the ECU 90 acquires the requested acceleration Greq, based on the accelerator pedal operation amount AP. The requested acceleration Greq is an acceleration which a driver of the own vehicle 100 requests as the acceleration of the own vehicle 100. The ECU 90 controls the activations of the driving apparatus 21, depending on the accelerator pedal operation amount AP.

<Brake Pedal Operation Amount Sensor>

The brake pedal operation amount sensor 34 is electrically connected to the ECU 90. The brake pedal operation amount sensor 34 detects an operation amount of the brake pedal 33 and sends information on the detected operation amount to the ECU 90. The ECU 90 acquires the operation amount of the brake pedal 33 as a brake pedal operation amount BP, based on the information sent from the brake pedal operation amount sensor 34. When the brake pedal operation amount BP is greater than zero, the ECU 90 controls the activations of the braking apparatus 22, depending on the brake pedal operation amount BP.

<Following Moving Operator>

The following moving operator 41 is a device which is operated by the driver of the own vehicle 100. The following moving operator 41 is, for example, a switch or a button. The switch or the button is, for example, provided on a steering wheel of the own vehicle 100 or a lever secured on a steering column of the own vehicle 100.

In this embodiment, the following moving operator 41 includes a following moving selecting switch, a vehicle moving speed setting switch, a vehicle moving speed increasing button, a vehicle moving speed decreasing button, and an inter-vehicle distance setting button. The following moving operator 41 is electrically connected to the ECU 90.

When (i) a following moving control described later is not executed, and (ii) the following moving selecting switch is operated by the driver of the own vehicle 100, a predetermined signal is sent from the following moving operator 41 to the ECU 90. In response to receiving that predetermined signal, the ECU 90 determines that the driver of the own vehicle 100 requests executing the following moving control. When the ECU 90 determines that the driver of the own vehicle 100 requests executing the following moving control, the ECU 90 executes the following moving control as far as a control stopping condition Cstop described later is not satisfied. On the other hand, when (i) the following moving control is being executed or an execution of the following moving control is suspended, and (ii) the following moving selecting switch is operated by the driver of the own vehicle 100, a predetermined signal is sent from the following moving operator 41 to the ECU 90. In response to receiving that predetermined signal, the ECU 90 determines that the driver of the own vehicle 100 requests terminating executing the following moving control. When the ECU 90 determines that the driver of the own vehicle 100 requests terminating executing the following moving control, the ECU 90 terminates executing the following moving control.

When (i) the following moving control is being executed or the execution of the following moving control is suspended, and (ii) the vehicle moving speed setting switch is operated by the driver of the own vehicle 100, a predetermined signal is sent from the following moving operator 41 to the ECU 90. In response to receiving that predetermined signal, the ECU 90 sets the current moving speed of the own vehicle 100 as a set vehicle moving speed SPDset used in the following moving control. Hereinafter, the moving speed of the own vehicle 100 will be referred to as "vehicle moving speed SPD".

When (i) the following moving control is being executed or the execution of the following moving control is suspended, and (ii) the vehicle moving speed increasing button is operated by the driver of the own vehicle 100, a predetermined signal is sent from the following moving operator 41 to the ECU 90. In response to receiving that predetermined signal, the ECU 90 increases the set vehicle moving speed SPDset. On the other hand, when (i) the following moving control is being executed or the execution of the following moving control is suspended, and (ii) the vehicle moving speed decreasing button is operated by the driver of the own vehicle 100, a predetermined signal is sent from the following moving operator 41 to the ECU 90. In response to receiving that predetermined signal, the ECU 90 decreases the set vehicle moving speed SPDset.

When (i) the following moving control is being executed or the execution of the following moving control is suspended, and (ii) the inter-vehicle distance setting button is operated by the driver of the own vehicle 100, a predetermined signal is sent from the following moving operator 41 to the ECU 90. This predetermined signal is a requested inter-vehicle distance signal which represents an own lane inter-vehicle distance Dfr and a next lane inter-vehicle distance Dsd which the driver of the own vehicle 100 requests as a target own lane inter-vehicle distance Dfr_tgt (a predetermined own lane inter-vehicle distance) and a target next lane inter-vehicle distance Dsd_tgt (a predetermined next lane inter-vehicle distance) by operating the inter-vehicle distance setting button.

Figure 2A:
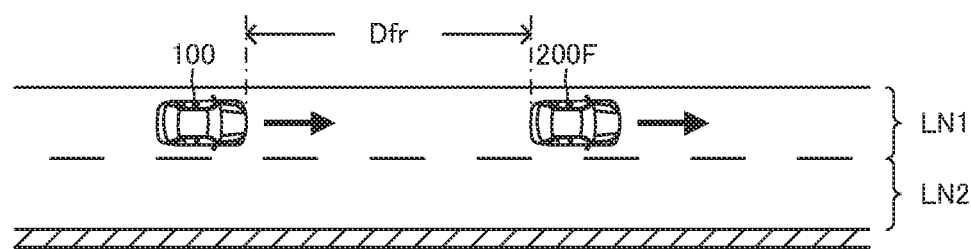
FIG. 2A is a view which shows a scene that the own vehicle is moved, following an own lane preceding vehicle by a following moving control.

As shown in FIG. 2A, the own lane inter-vehicle distance Dfr is a distance between an own lane preceding vehicle 200F and the own vehicle 100, and the target own lane inter-vehicle distance Dfr_tgt is a target of the own lane inter-vehicle distance Dfr in the following moving control. In this embodiment, the own lane preceding vehicle 200F is a preceding vehicle which is within a predetermined distance range forward from the own vehicle 100 and moves in a lane in which the own vehicle 100 moves. Hereinafter, the lane in which the own vehicle 100 moves will be referred to as "own lane LN1".

Figure 3A:
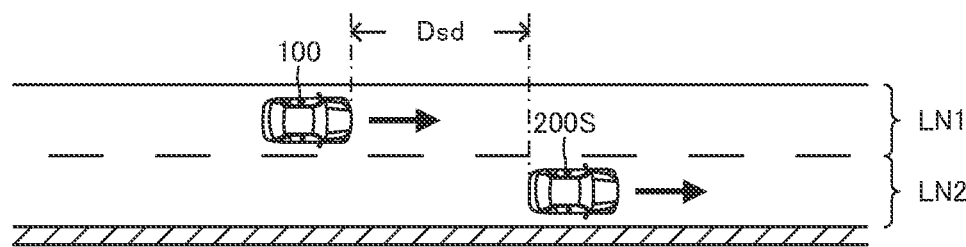
FIG. 3A is a view which shows a scene that the own vehicle is moved, following a next lane preceding vehicle by the following moving control.

Further, as shown in FIG. 3A, the next lane inter-vehicle distance Dsd is a distance between a next lane preceding vehicle 200S and the own vehicle 100, and the target next lane inter-vehicle distance Dsd_tgt is a target of the next lane inter-vehicle distance Dsd in the following moving control. In this embodiment, the next lane preceding vehicle 200S is a preceding vehicle which is within a predetermined distance range forward from the own vehicle 100 and moves in a lane next to the own lane LN1. Hereinafter, the lane next to the own lane LN1 will be referred to as "next lane LN2".

In this embodiment, there are three distances, i.e., a long distance, a middle distance, and a short distance as the own lane inter-vehicle distance Dfr and the next lane inter-vehicle distance Dsd which the driver of the own vehicle 100 can request as the target own lane inter-vehicle distance Dfr_tgt and the target next lane inter-vehicle distance Dsd_tgt by operating the inter-vehicle distance setting button.

When the ECU 90 receives the requested inter-vehicle distance signal, the ECU 90 sets the target own lane inter-vehicle distance Dfr_tgt, depending on the own lane inter-vehicle distance Dfr which the requested inter-vehicle distance signal represents. Hereinafter, the own lane inter-vehicle distance Dfr which the requested inter-vehicle distance signal represents, will be referred to as "requested own lane inter-vehicle distance Dfr_req". Further, when the ECU 90 receives the requested inter-vehicle distance signal, the ECU 90 sets the target next lane inter-vehicle distance Dsd_tgt, depending on the next lane inter-vehicle distance Dsd which the requested inter-vehicle distance signal represents. Hereinafter, the next lane inter-vehicle distance Dsd which the requested inter-vehicle distance signal represents, will be referred to as "requested next lane inter-vehicle distance Dsd_req".

The ECU 90 may be configured to (i) set the target own lane inter-vehicle distance Dfr_tgt, depending on the requested own lane inter-vehicle distance Dfr_req without considering the vehicle moving speed SPD and (ii) set the target next lane inter-vehicle distance Dsd_tgt, depending on the requested next lane inter-vehicle distance Dsd_req without considering the vehicle moving speed SPD. However, in this embodiment, the ECU 90 (i) sets the target own lane inter-vehicle distance Dfr_tgt, depending on the requested own lane inter-vehicle distance Dfr_req with considering the vehicle moving speed SPD and (ii) sets the target next lane inter-vehicle distance Dsd_tgt, depending on the requested next lane inter-vehicle distance Dsd_req with considering the vehicle moving speed SPD.

In particular, the ECU 90 sets the target own lane inter-vehicle distance Dfr_tgt to the own lane inter-vehicle distance Dfr which allows a time TTCfr which is acquired by dividing the own lane inter-vehicle distance Dfr by the current vehicle moving speed SPD, to be controlled to a predetermined time (in this embodiment, a predetermined predicted reaching time TTCfr_ref). In other words, the ECU 90 sets the target own lane inter-vehicle distance Dfr_tgt to the own lane inter-vehicle distance Dfr which allows a relationship between (i) the current vehicle moving speed SPD, (ii) the predetermined predicted reaching time TTCfr_ref, and (iii) the own lane inter-vehicle distance Dfr, to correspond to a relationship defined by an expression 1 described below.

$$TTCfr\_ref = Dfr/SPD \quad (1)$$

When the requested own lane inter-vehicle distance Dfr_req is the long distance, the predetermined predicted reaching time TTCfr_ref is a long time TTCfr_long. When the requested own lane inter-vehicle distance Dfr_req is the middle distance, the predetermined predicted reaching time TTCfr_ref is a middle time TTCfr_mid. When the requested own lane inter-vehicle distance Dfr_req is the short distance, the predetermined predicted reaching time TTCfr_ref is a short time TTCfr_short.

Similarly, the ECU 90 sets the target next lane inter-vehicle distance Dsd_tgt to the next lane inter-vehicle distance Dsd which allows a time TTCsd which is acquired by dividing the next lane inter-vehicle distance Dsd by the current vehicle moving speed SPD, to be controlled to a predetermined time (in this embodiment, a predetermined predicted reaching time TTCsd_ref). In other words, the ECU 90 sets the target next lane inter-vehicle distance Dsd_tgt to the next lane inter-vehicle distance Dsd which allows a relationship between (i) the current vehicle moving speed SPD, (ii) the predetermined predicted reaching time TTCsd_ref, and (iii) the next lane inter-vehicle distance Dsd, to correspond to a relationship defined by an expression 2 described below.

$$TTCsd\_ref = Dsd/SPD \quad (2)$$

When the requested next lane inter-vehicle distance Dsd_req is the long distance, the predetermined predicted reaching time TTCsd_ref is a long time TTCsd_long. When the requested next lane inter-vehicle distance Dsd_req is the middle distance, the predetermined predicted reaching time TTCsd_ref is a middle time TTCsd_mid. When the requested next lane inter-vehicle distance Dsd_req is the short distance, the predetermined predicted reaching time TTCsd_ref is a short time TTCsd_short.

<Forward Information Detecting Apparatus>

The forward information detecting apparatus 42 is an apparatus which detects information on a situation ahead of the own vehicle 100. The forward information detecting apparatus 42 is, for example, a camera, radar sensors (millimeter wave radars), ultrasonic wave sensors (clearance sonars), and/or laser radars (LiDARs).

The forward information detecting apparatus 42 is electrically connected to the ECU 90. The forward information detecting apparatus 42 sends forward information on the situation ahead of the own vehicle 100 to the ECU 90. The ECU 90 acquires (i) distances between the own vehicle 100 and the other vehicles ahead of the own vehicle 100 (i.e., the own lane preceding vehicle 200F and the next lane preceding vehicles 200S), (ii) orientations of the other vehicles with respect to the own vehicle 100, and (iii) moving speeds (vehicle moving speeds) of the other vehicles.

<Vehicle Moving Speed Detecting Apparatus>

The vehicle moving speed detecting apparatus 43 is an apparatus which detects the vehicle moving speed SPD of the own vehicle 100. The vehicle moving speed detecting apparatus 43 is, for example, vehicle wheel rotation speed sensors. The vehicle moving speed detecting apparatus 43 is electrically connected to the ECU 90. The vehicle moving speed detecting apparatus 43 detects the vehicle moving speed SPD of the own vehicle 100 and sends information on the detected vehicle moving speed SPD to the ECU 90. The ECU 90 acquires the vehicle moving speed SPD, based on the information sent from the vehicle moving speed detecting apparatus 43.

<GPS Device>

The GPS device 44 is electrically connected to the ECU 90. The GPS device 44 receives GPS signals and sends the received GPS signals to the ECU 90. The ECU 90 acquires a current position of the own vehicle 100, based on the received GPS signals.

<Database>

The database 45 memorizes map data Dmap and traffic information data Dtraffic therein. The vehicle driving assist apparatus 10 may be configured to acquire the map data Dmap and the traffic information data Dtraffic by wireless from database outside of the own vehicle 100.

The database 45 is electrically connected to the ECU 90. The ECU 90 specifies a point where the own vehicle 100 currently moves on a map by collating the current position of the own vehicle 100 and the map data Dmap memorized in the database 45. Then, the ECU 90 acquires traffic information Itraffic which relates to a moving of the own vehicle 100 at the point, based on the traffic information data Dtraffic memorized in the database 45.

In this embodiment, the traffic information data Dtraffic includes information on types of the lane in which the own vehicle 100 moves (i.e., the own lane LN1) and the lane next to the own lane LN1 (i.e., the next lane LN2). In other words, the traffic information data Dtraffic includes information on which the own lane LN1 is, a cruising lane or a passing lane (or an overtaking lane) and which the next lane LN2 is, the cruising lane or the passing lane. The ECU 90 can recognize which the own lane LN1 is, the cruising lane or the passing lane, based on that information. In addition, the ECU 90 can recognize which the next lane LN2 is, the cruising lane or the passing lane, based on that information.

When the forward information detecting apparatus 42 is a camera, the ECU 90 may be configured to recognize which the own lane LN1 is, the cruising lane or the passing lane, based on images taken by the camera. In addition, the ECU 90 may be configured to recognize which the next lane LN2 is, the cruising lane or the passing lane, based on the images taken by the camera.

Further, the traffic information data Dtraffic includes information on a type of a road on which the own vehicle 100 moves, i.e., information on which the road on which the own vehicle 100 moves is, a general road or an express highway. The ECU 90 can recognize which the road on which the own vehicle 100 moves is, the general road or the express highway, based on that information.

<Signal Receiving Device>

The signal receiving device 46 is a device which receives wireless signals coming from outside of the own vehicle 100. In this embodiment, the signal receiving device 46 receives the wireless signals which represent information on the traffic congestion of the road. The signal receiving device 46 is electrically connected to the ECU 90. The signal receiving device 46 sends the received wireless signals to the ECU 90. The ECU 90 can recognize whether the traffic congestion of vehicles in the next lane LN2 occurs, based on (i) the information on the traffic congestion represented by the wireless signals and (ii) the current position of the own vehicle 100.

Whether the traffic congestion occurs, is determined in accordance with a definition of the general traffic congestion. When the forward information detecting apparatus 42 is a camera, the ECU 90 may be configured to recognize whether the traffic congestion of the vehicles occurs in the next lane LN2, based on the images taken by the camera.

<Summary of Operations of Vehicle Driving Assist Apparatus>

Next, a summary of operations of the vehicle driving assist apparatus 10 will be described. When the vehicle driving assist apparatus 10 determines that the driver of the own vehicle 100 requests executing the following moving control, the vehicle driving assist apparatus 10 executes the following moving control as far as the control suspending condition Cstop is not satisfied.

The following moving control of this embodiment includes (i) a normal following moving control, (ii) a passing preventing following moving control (or an overtaking preventing following moving control), and (iii) a constant speed moving control.

When (i) there is the own lane preceding vehicle 200F, and (ii) there is not the next lane preceding vehicle 200S as shown in FIG. 2A, the vehicle driving assist apparatus 10 executes the normal following moving control. In this case, the vehicle driving assist apparatus 10 controls the activations of the driving apparatus 21 and/or the braking apparatus 22 so as to move the own vehicle 100, following the own lane preceding vehicle 200F. In other words, the vehicle driving assist apparatus 10 calculates a target acceleration Gtgt which maintains the own lane inter-vehicle distance Dfr at the target own lane inter-vehicle distance Dfr_tgt. Then, the vehicle driving assist apparatus 10 controls the activations of the driving apparatus 21 and/or the braking apparatus 22 so as to realize the target acceleration Gtgt.

Figure 2B:
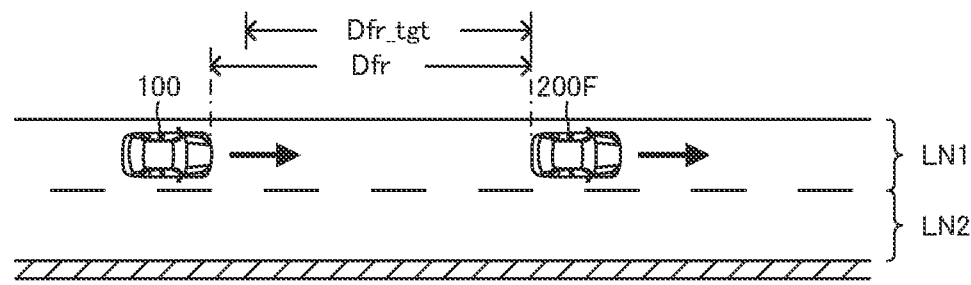
FIG. 2B is a view which shows a scene that an own lane inter-vehicle distance is longer than a target own lane inter-vehicle distance.

In particular, when the own lane inter-vehicle distance Dfr is longer than the target own lane inter-vehicle distance Dfr_tgt as shown in FIG. 2B, the vehicle driving assist apparatus 10 calculates a target acceleration Gtgt which decreases the own lane inter-vehicle distance Dfr and controls the activations of the driving apparatus 21 to realize the target acceleration Gtgt. In this case, the calculated target acceleration Gtgt is positive. Thus, the vehicle moving speed SPD of the own vehicle 100 is increased. As a result, the own lane inter-vehicle distance Dfr is decreased.

Figure 2C:
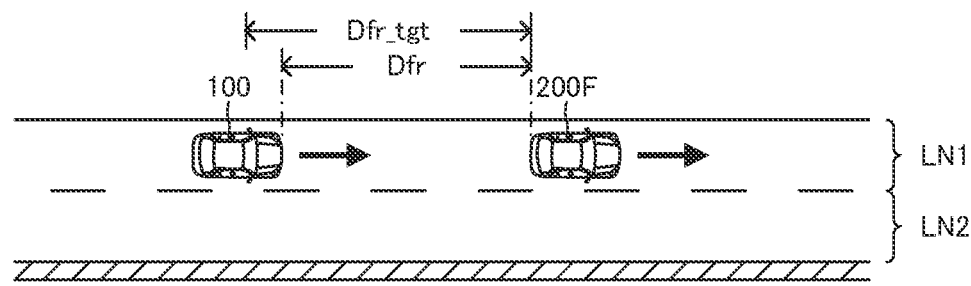
FIG. 2C is a view which shows a scene that the own lane inter-vehicle distance is shorter than the target own lane inter-vehicle distance.

On the other hand, when the own lane inter-vehicle distance Dfr is shorter than the target own lane inter-vehicle distance Dfr_tgt as shown in FIG. 2C, the vehicle driving assist apparatus 10 calculates the target acceleration Gtgt which increases the own lane inter-vehicle distance Dfr and controls the activations of the braking apparatus 22 (and/or the driving apparatus 21) to realize the target acceleration Gtgt. In this case, the calculated target acceleration Gtgt is negative. In other words, a target deceleration is calculated. Thus, the vehicle moving speed SPD of the own vehicle 100 is decreased. As a result, the own lane inter-vehicle distance Dfr is increased.

Further, when (i) there is the next lane preceding vehicle 200S, and (ii) there is not the own lane preceding vehicle 200F as shown in FIG. 3A, the vehicle driving assist apparatus 10 executes the passing preventing following moving control. In this case, the vehicle driving assist apparatus 10 controls the activations of the driving apparatus 21 and/or the braking apparatus 22 so as to move the own vehicle 100 without passing the next lane preceding vehicle 200S. In other words, the vehicle driving assist apparatus 10 calculates the target acceleration Gtgt which maintains the next lane inter-vehicle distance Dsd at the target next lane inter-vehicle distance Dsd_tgt (or a minimum inter-vehicle distance). Then, the vehicle driving assist apparatus 10 controls the activations of the driving apparatus 21 and/or the braking apparatus 22 so as to realize the target acceleration Gtgt.

In this embodiment, the target next lane inter-vehicle distance Dsd_tgt is set to a value greater than or equal to zero. In this regard, the own vehicle 100 should be controlled so as not to have passed the next lane preceding vehicle 200S. Thus, the target next lane inter-vehicle distance Dsd_tgt may be set to a value smaller than zero as far as the own vehicle 100 can be considered not to have passed the next lane preceding vehicle 200S. On the other hand, when the target own lane inter-vehicle distance Dfr_tgt is set to a value smaller than or equal to zero, the own vehicle 100 contacts the own lane preceding vehicle 200F. Thus, the target own lane inter-vehicle distance Dfr_tgt is set to a value greater than zero. In addition, the target own lane inter-vehicle distance Dfr_tgt is set to a value which allows the vehicle driving assist apparatus 10 to decelerate the own vehicle 100 without contacting the own lane preceding vehicle 200F even when the own lane preceding vehicle 200F is suddenly decelerated.

Figure 3B:
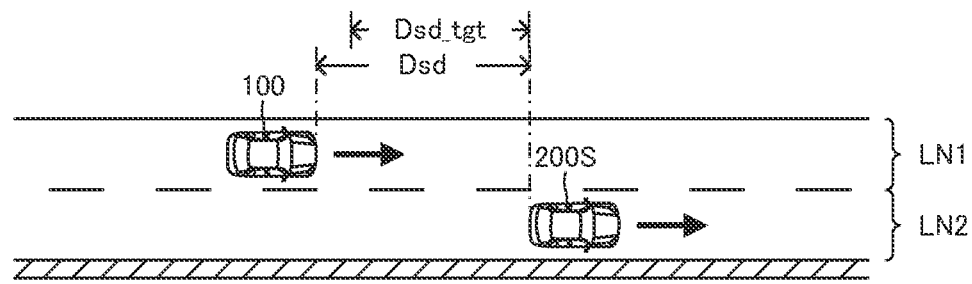
FIG. 3B is a view which shows a scene that a next lane inter-vehicle distance is longer than a target next lane inter-vehicle distance.

In particular, when the next lane inter-vehicle distance Dsd is longer than the target next lane inter-vehicle distance Dsd_tgt as shown in FIG. 3B, the vehicle driving assist apparatus 10 calculates the target acceleration Gtgt which decreases the next lane inter-vehicle distance Dsd and controls the activations of the driving apparatus 21 to realize the target acceleration Gtgt. In this case, the calculated target acceleration Gtgt is positive. Thus, the vehicle moving speed SPD of the own vehicle 100 is increased. As a result, the next lane inter-vehicle distance Dsd is decreased.

Figure 3C:
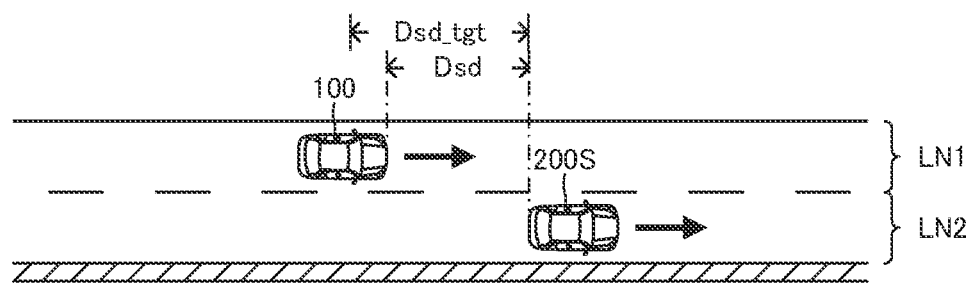
FIG. 3C is a view which shows a scene that the next lane inter-vehicle distance is shorter than the target next lane inter-vehicle distance.

On the other hand, when the next lane inter-vehicle distance Dsd is shorter than the target next lane inter-vehicle distance Dsd_tgt as shown in FIG. 3C, the vehicle driving assist apparatus 10 calculates the target acceleration Gtgt which increases the next lane inter-vehicle distance Dsd and controls the activations of the braking apparatus 22 (and/or the driving apparatus 21) to realize the target acceleration Gtgt. In this case, the calculated target acceleration Gtgt is negative. In other words, the target deceleration is calculated. Thus, the vehicle moving speed SPD of the own vehicle 100 is decreased. As a result, the next lane inter-vehicle distance Dsd is increased.

Figure 4:
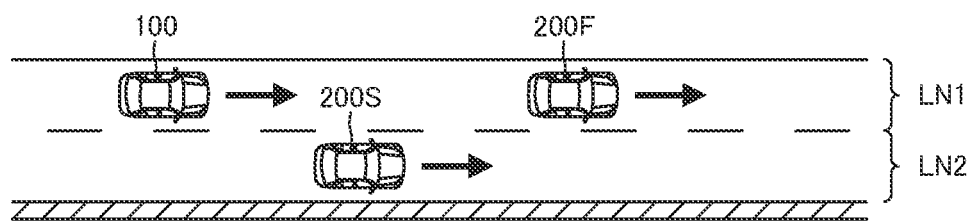
FIG. 4 is a view which shows a scene that there are the own lane preceding vehicle and the next lane preceding vehicle.

Further, when there are the own lane preceding vehicle 200F and the next lane preceding vehicle 200S as shown in FIG. 4, the vehicle driving assist apparatus 10 executes the passing preventing following moving control. In this case, the vehicle driving assist apparatus 10 controls the activations of the driving apparatus 21 and/or the braking apparatus 22, depending on (i) a magnitude relationship between the own lane inter-vehicle distance Dfr and the target own lane inter-vehicle distance Dfr_tgt and (ii) a magnitude relationship between the next lane inter-vehicle distance Dsd and the target next lane inter-vehicle distance Dsd_tgt.

Figure 5A:
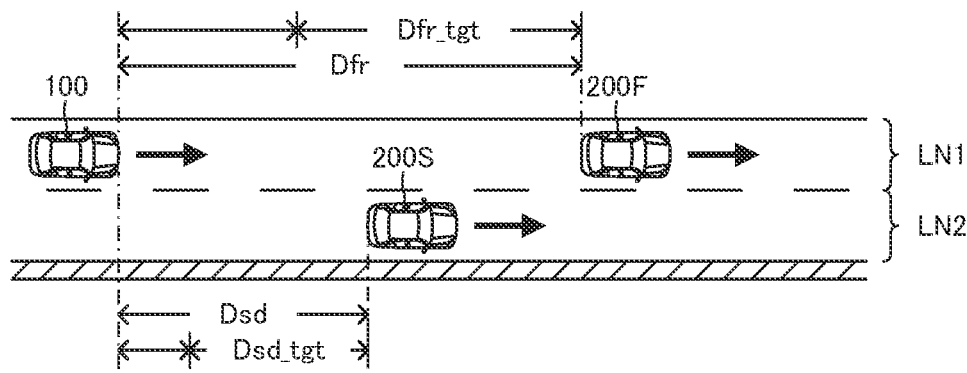
FIG. 5A is a view which shows a scene that there are the own lane preceding vehicle and the next lane preceding vehicle.

In particular, when (i) the own lane inter-vehicle distance Dfr is longer than the target own lane inter-vehicle distance Dfr_tgt, and the next lane inter-vehicle distance Dsd is longer than the target next lane inter-vehicle distance Dsd_tgt (i.e., the inter-vehicle distances are both longer than the corresponding target inter-vehicle distances) as shown in FIG. 5A, and (ii) a next lane inter-vehicle distance difference dDsd is shorter than an own lane inter-vehicle distance difference dDfr, the vehicle driving assist apparatus 10 calculates the target acceleration Gtgt which decreases the next lane inter-vehicle distance Dsd and controls the activations of the driving apparatus 21 to realize the target acceleration Gtgt. The next lane inter-vehicle distance difference dDsd is a difference between the next lane inter-vehicle distance Dsd and the target next lane inter-vehicle distance Dsd_tgt, and the own lane inter-vehicle distance difference dDfr is a difference between the own lane inter-vehicle distance Dfr and the target own lane inter-vehicle distance Dfr_tgt. In this case, the calculated target acceleration Gtgt is positive. Thus, the vehicle moving speed SPD of the own vehicle 100 is increased. As a result, the next lane inter-vehicle distance Dsd is decreased.

Figure 5B:
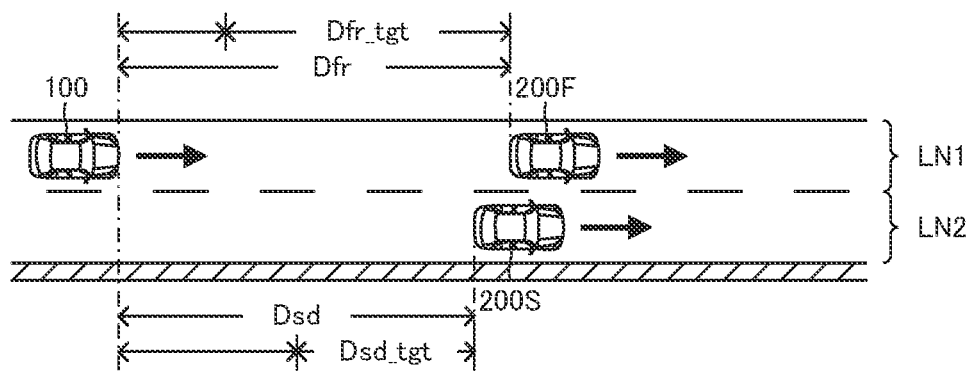
FIG. 5B is a view which shows another scene that there are the own lane preceding vehicle and the next lane preceding vehicle.

On the other hand, when the own lane inter-vehicle distance difference dDfr is shorter than the next lane inter-vehicle distance difference dDsd as shown in FIG. 5B, the vehicle driving assist apparatus 10 calculates the target acceleration Gtgt which decreases the own lane inter-vehicle distance Dfr and controls the activations of the driving apparatus 21 to realize the target acceleration Gtgt. Also, in this case, the calculated target acceleration Gtgt is positive. Thus, the vehicle moving speed SPD of the own vehicle 100 is increased. As a result, the own lane inter-vehicle distance Dfr is decreased.

Figure 5C:
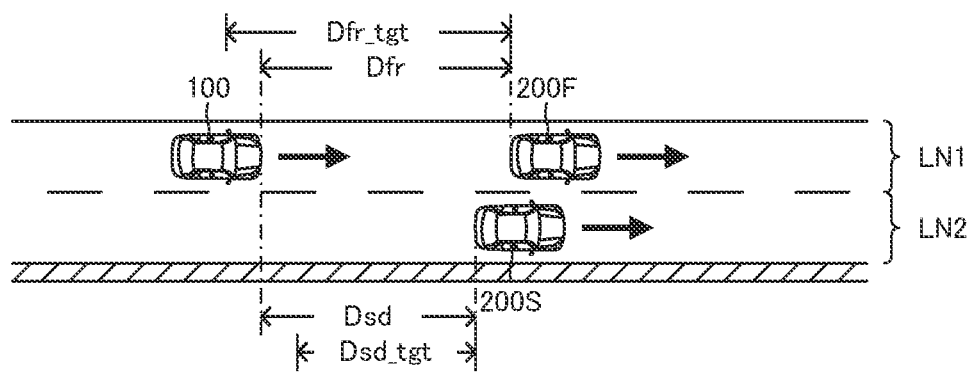
FIG. 5C is a view which shows further another scene that there are the own lane preceding vehicle and the next lane preceding vehicle.

Further, when (i) the own lane inter-vehicle distance Dfr is shorter than the target own lane inter-vehicle distance Dfr_tgt, and (ii) the next lane inter-vehicle distance Dsd is shorter than the target next lane inter-vehicle distance Dsd_tgt as shown in FIG. 5C, the vehicle driving assist apparatus 10 calculates the target acceleration Gtgt which increases the own lane inter-vehicle distance Dfr and controls the activations of the braking apparatus 22 (and/or the driving apparatus 21) to realize the target acceleration Gtgt. In this case, the calculated target acceleration Gtgt is negative. In other words, the target deceleration is calculated. Thus, the vehicle moving speed SPD of the own vehicle 100 is decreased. As a result, the own lane inter-vehicle distance Dfr is increased.

Figure 5D:
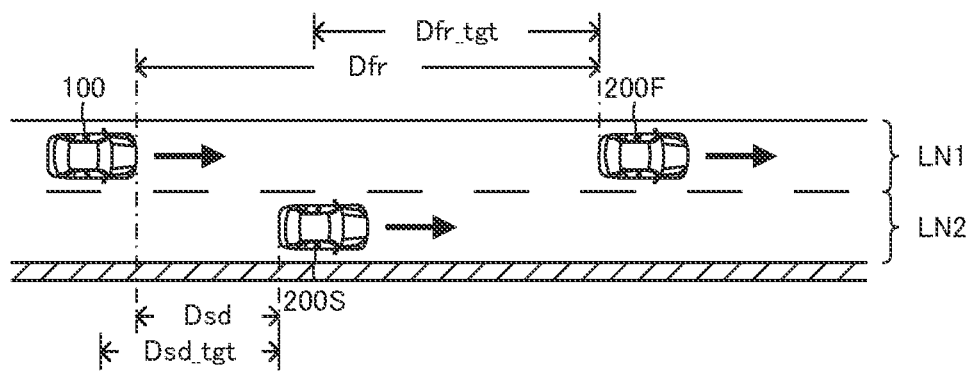
FIG. 5D is a view which shows further another scene that there are the own lane preceding vehicle and the next lane preceding vehicle.

On the other hand, when (i) the own lane inter-vehicle distance Dfr is longer than the target own lane inter-vehicle distance Dfr_tgt, and (ii) the next lane inter-vehicle distance Dsd is shorter than the target next lane inter-vehicle distance Dsd_tgt as shown in FIG. 5D, the vehicle driving assist apparatus 10 calculates the target acceleration Gtgt which increases the next lane inter-vehicle distance Dsd and controls the activations of the braking apparatus 22 (and/or the driving apparatus 21) to realize the target acceleration Gtgt. In this case, the calculated target acceleration Gtgt is negative. In other words, the target deceleration is calculated. Thus, the vehicle moving speed SPD of the own vehicle 100 is decreased. As a result, the next lane inter-vehicle distance Dsd is increased.

Figure 6:
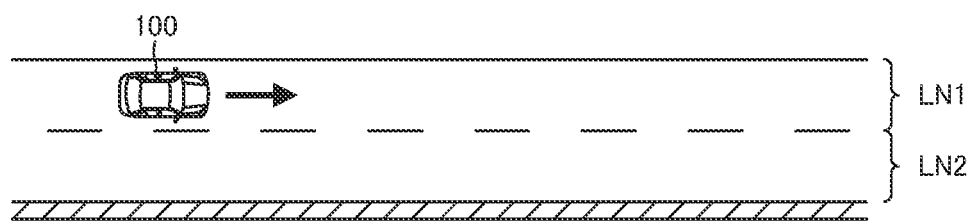
FIG. 6 is a view which shows a scene that there is not the own lane preceding vehicle or the next lane preceding vehicle.

Further, when there are not the own lane preceding vehicle 200F or the next lane preceding vehicle 200S as shown in FIG. 6, the vehicle driving assist apparatus 10 executes the constant speed moving control. In this case, the vehicle driving assist apparatus 10 controls the activations of the driving apparatus 21 and/or the braking apparatus 22 so as to maintain the vehicle moving speed SPD at the set vehicle moving speed SPDset.

<Following Moving Control Suspended and Restarted>

Next, processes of suspending executing the following moving control and restarting executing the following moving control by the vehicle driving assist apparatus 10 will be described. As described above, when the vehicle driving assist apparatus 10 determines that the driver of the own vehicle 100 requests executing the following moving control, the vehicle driving assist apparatus 10 executes the following moving control as far as the control suspending condition Cstop is not satisfied.

The control suspending condition Cstop is a condition that (i) the following moving control is being executed, and (ii) the driver of the own vehicle 100 carries out an accelerating operation to accelerate the own vehicle 100. Thus, when (i) the vehicle driving assist apparatus 10 is executing the following moving control, and (ii) the accelerating operation is carried out by the driver of the own vehicle 100, the vehicle driving assist apparatus 10 determines that the control suspending condition Cstop becomes satisfied.

In this embodiment, the accelerating operation is an operation of pressing the accelerator pedal 31 by the driver of the own vehicle 100 and/or an operation of operating the vehicle moving speed increasing button of the following moving operator 41 for a predetermined time or more, i.e., long-pressing the vehicle moving speed increasing button.

When the vehicle driving assist apparatus 10 determines that the control suspending condition Cstop becomes satisfied, the vehicle driving assist apparatus 10 suspends executing the following moving control and starts a process of measuring an elapsing time Telp which elapses since the vehicle driving assist apparatus 10 suspends executing the following moving control.

The own vehicle 100 may pass the next lane preceding vehicle 200S before the elapsing time Telp reaches a predetermined time Telp_th. In this case, when the own vehicle 100 has passed the next lane preceding vehicle 200S, the vehicle driving assist apparatus 10 resets the elapsing time Telp and starts measuring a time which elapses since the own vehicle 100 passed the next lane preceding vehicle 200S as the elapsing time Telp.

Each time the own vehicle 100 has passed the next lane preceding vehicle 200S before the elapsing time Telp reaches the predetermined time Telp_th, the vehicle driving assist apparatus 10 resets the elapsing time Telp and starts measuring a time which elapses since the own vehicle 100 has passed the next lane preceding vehicle 200S as the elapsing time Telp.

When the control suspending condition Cstop becomes unsatisfied, i.e., a control restarting condition becomes satisfied, the vehicle driving assist apparatus 10 restarts executing the following moving control.

The vehicle driving assist apparatus 10 may be configured to determine that the control suspending condition Cstop becomes unsatisfied in response to the elapsing time Telp reaching the predetermined time Telp_th. However, in this embodiment, the vehicle driving assist apparatus 10 determines that the control suspending condition Cstop becomes unsatisfied in response to the elapsing time Telp reaching the predetermined time Telp_th when the accelerating operation is not carried out by the driver of the own vehicle 100.

Figure 7:
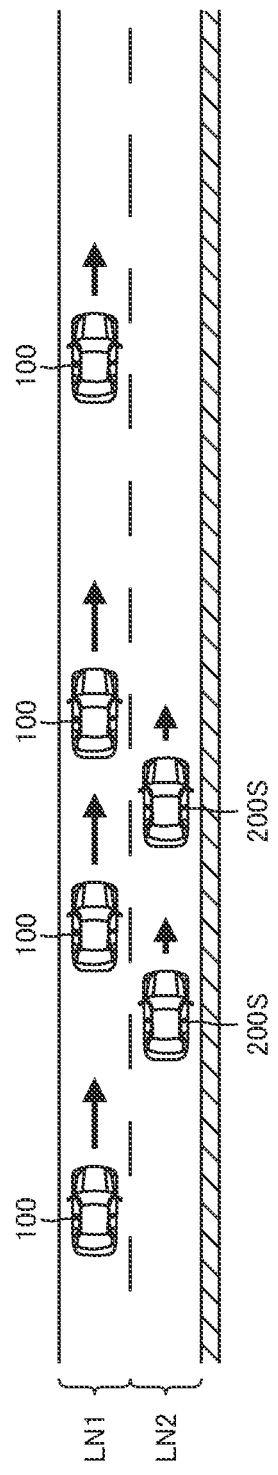
FIG. 7 is a view which shows a scene that there are the next lane preceding vehicles in a next lane next to a lane in which the own vehicle moves.

Thereby, when there are the next lane preceding vehicles 200S as shown in FIG. 7, the processes of suspending executing the following moving control and restarting executing the following moving control are executed as described below.

Figure 8:
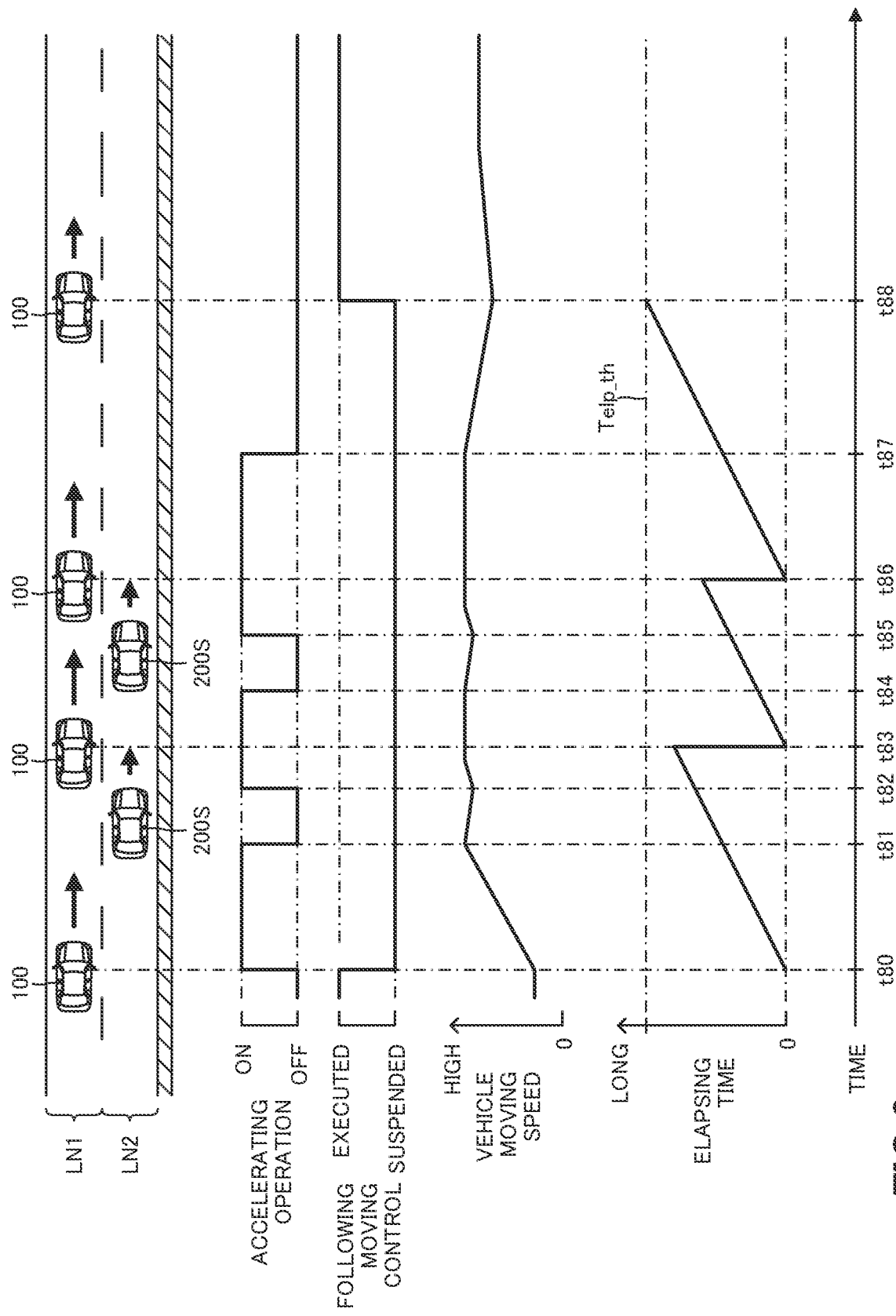
FIG. 8 is a view which shows the own vehicle and etc. when an execution of the following moving control by the vehicle driving assist apparatus according to the invention is suspended and restarted.

As shown in FIG. 8, at a point of time t80, the driver of the own vehicle 100 starts the accelerating operation to pass two next lane preceding vehicles 200S. Then, the control suspending condition Cstop becomes satisfied. Thus, the execution of the following moving control is suspended, and the vehicle moving speed SPD starts increasing. In addition, at this point of time, the measurement of the elapsing time Telp is started.

Then, at a point of time 81 before the elapsing time Telp reaches the predetermined time Telp_th, the own vehicle 100 has passed the first next lane preceding vehicle 200S. Thus, the elapsing time Telp is reset, and the measurement of the elapsing time Telp is started.

Then, at the point of time 81, the accelerating operation is stopped. At this point of time, the elapsing time Telp does not reach the predetermined time Telp_th. Thus, the execution of the following moving control is not restarted and is still suspended. Thus, the vehicle moving speed SPD slightly decreases, but does not considerably decrease.

Then, at a point of time t82, the accelerating operation is restarted. At this point of time, the vehicle moving speed SPD has not considerably decreased. Thus, the vehicle moving speed SPD reaches a relatively high speed immediately.

Then, at a point of time t83, the own vehicle 100 has passed the first next lane preceding vehicle 200S. Thus, the elapsing time Telp is reset, and the measurement of the elapsing time Telp is started.

Then, at a point of time t84, the accelerating operation is stopped. At this point of time, the elapsing time Telp does not reach the predetermined time Telp_th. Thus, the execution of the following moving control is not restarted and still suspended. Thus, the vehicle moving speed SPD slightly decreases, but does not considerably decrease.

Then, at a point of time t85, the accelerating operation is restarted. At this point of time, the vehicle moving speed SPD has not considerably decreased. Thus, the vehicle moving speed SPD reaches the relatively high speed immediately.

Then, at a point of time t86, the own vehicle 100 has passed the second next lane preceding vehicle 200S. Thus, the elapsing time Telp is reset, and the measurement of the elapsing time Telp is started.

Then, at a point of time t87, the accelerating operation is stopped. At this point of time, the elapsing time Telp does not reach the predetermined time Telp_th. Thus, the execution of the following moving control is not restarted. Then, at a point of time t88, the elapsing time Telp reaches the predetermined time Telp_th. At this point of time, the accelerating operation is not carried out. Thus, the control suspending condition Cstop becomes unsatisfied, i.e., the control restarting condition becomes satisfied. Thus, the execution of the following moving control is restarted.

<Effects>

If the vehicle driving assist apparatus 10 is configured to (i) suspend executing the following moving control in response to the accelerating operation being carried out and (ii) restart executing the following moving control in response to the accelerating operation being stopped, the execution of the following moving control is restarted when the accelerating operation is temporarily stopped before the own vehicle 100 has passed the next lane preceding vehicle 200S after the driver of the own vehicle 100 starts the accelerating operation in order to pass the next lane preceding vehicle 200S. In this case, the vehicle moving speed SPD of the own vehicle 100 is considerably decreased. Thus, the driver needs to considerably accelerate the own vehicle 100 and increase the vehicle moving speed SPD in order to pass the next lane preceding vehicle 200S. Thus, the driver of the own vehicle 100 cannot smoothly pass the next lane preceding vehicle 200S.

Further, when the driver of the own vehicle 100 starts the accelerating operation in order to pass the next lane preceding vehicles 200S, and then temporarily stops the accelerating operation when the own vehicle 100 has passed the first next lane preceding vehicle 200S, the execution of the following moving control is restarted. As a result, the vehicle moving speed SPD of the own vehicle 100 is considerably decreased. Thus, the driver cannot move the own vehicle 100 to pass the second next lane preceding vehicle 200S.

The vehicle driving assist apparatus 10 according to the embodiment does not restart executing the following moving control as far as the predetermined time Telp_th does not elapse even when the driver of the own vehicle 100 temporarily stops the accelerating operation before the own vehicle 100 has passed the next lane preceding vehicle 200S after the driver starts the accelerating operation to pass the next lane preceding vehicle 200S. Thus, the vehicle moving speed SPD of the own vehicle 100 is not considerably decreased. Thus, the driver of the own vehicle 100 can move the own vehicle 100 to smoothly pass the next lane preceding vehicle 200S.

In addition, the vehicle driving assist apparatus 10 according to the embodiment (i) resets the elapsing time Telp when the own vehicle 100 has passed the first next lane preceding vehicle 200S, and then (ii) starts measuring the elapsing time Telp. Thus, even when the driver of the own vehicle 100 temporarily stops the accelerating operation when the own vehicle 100 has passed the first next lane preceding vehicle 200S, the execution of the following moving control is not restarted. Thus, the vehicle moving speed SPD of the own vehicle 100 is not considerably decreased. Thus, the driver of the own vehicle 100 can move the own vehicle 100 to smoothly pass the second next lane preceding vehicle 200S.

<Specific Operations of Vehicle Driving Assist Apparatus>

Next, an example of specific operations of the vehicle driving assist apparatus 10 will be described. The CPU of the ECU 90 of the vehicle driving assist apparatus 10 is configured or programmed to execute a routine shown in FIG. 9 each time a predetermined calculation time elapses.

Figure 9:
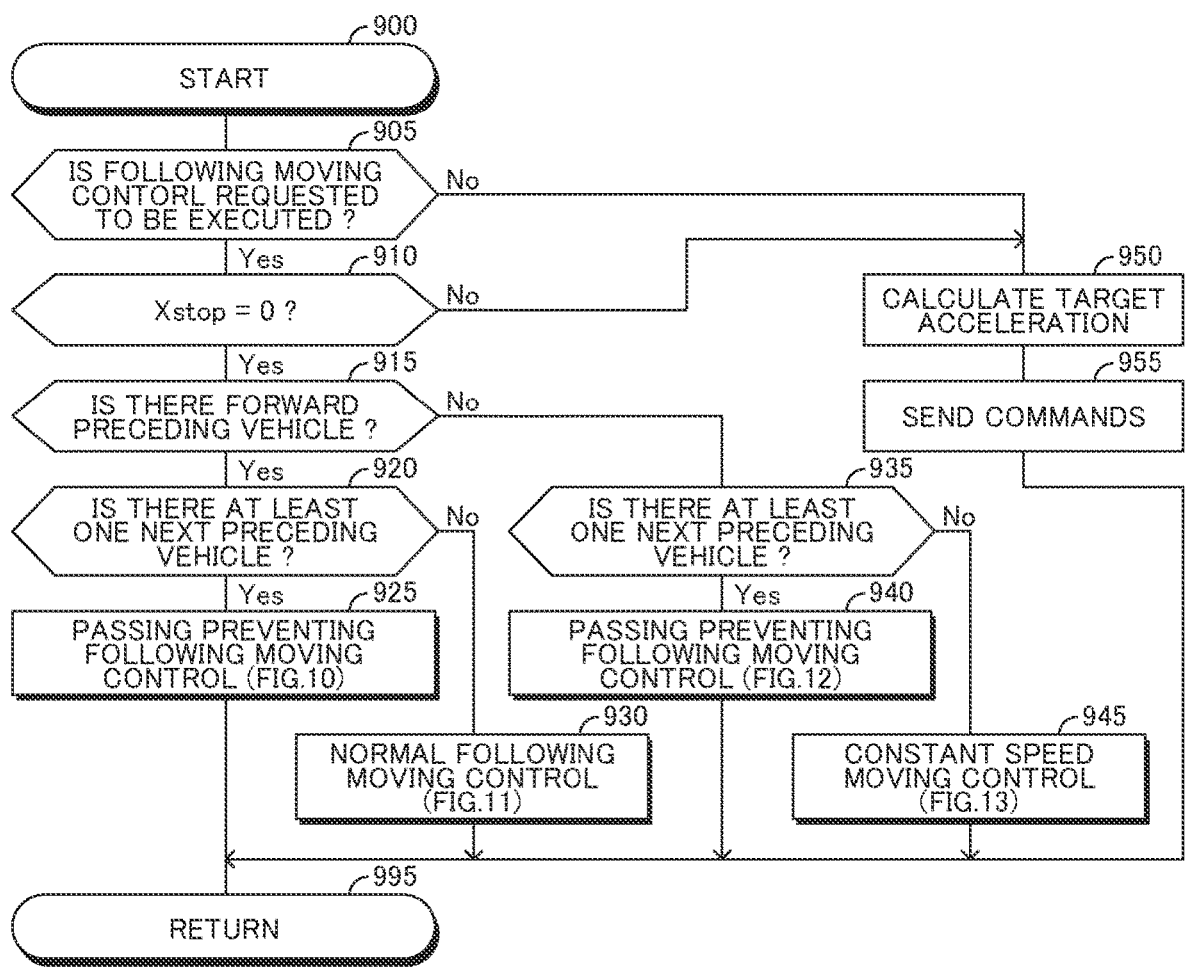
FIG. 9 is a view which shows a flowchart of a routine executed by the vehicle driving assist apparatus according to the embodiment of the invention.

Thus, at a predetermined timing, the CPU starts executing a process from a step 900 of the routine shown in FIG. 9 and proceeds with the process to a step 905 to determine whether the execution of the following moving control is requested.

When the CPU determines "Yes" at the step 905, the CPU proceeds with the process to a step 910 to determine whether a value of a control suspending flag Xstop is "0". The control suspending flag Xstop is a flag which represents whether the execution of the following moving control is suspended. The value of the control suspending flag Xstop is "1" when the execution of the following moving control has been suspended. On the other hand, the value of the control suspending flag Xstop is "0" when the following moving control is being executed.

When the CPU determines "Yes" at the step 910, the CPU proceeds with the process to a step 915 to determine whether there is the own lane preceding vehicle 200F.

When the CPU determines "Yes" at the step 915, the CPU proceeds with the process to a step 920 to determine whether there is at least one next lane preceding vehicle 200S.

Figure 10:
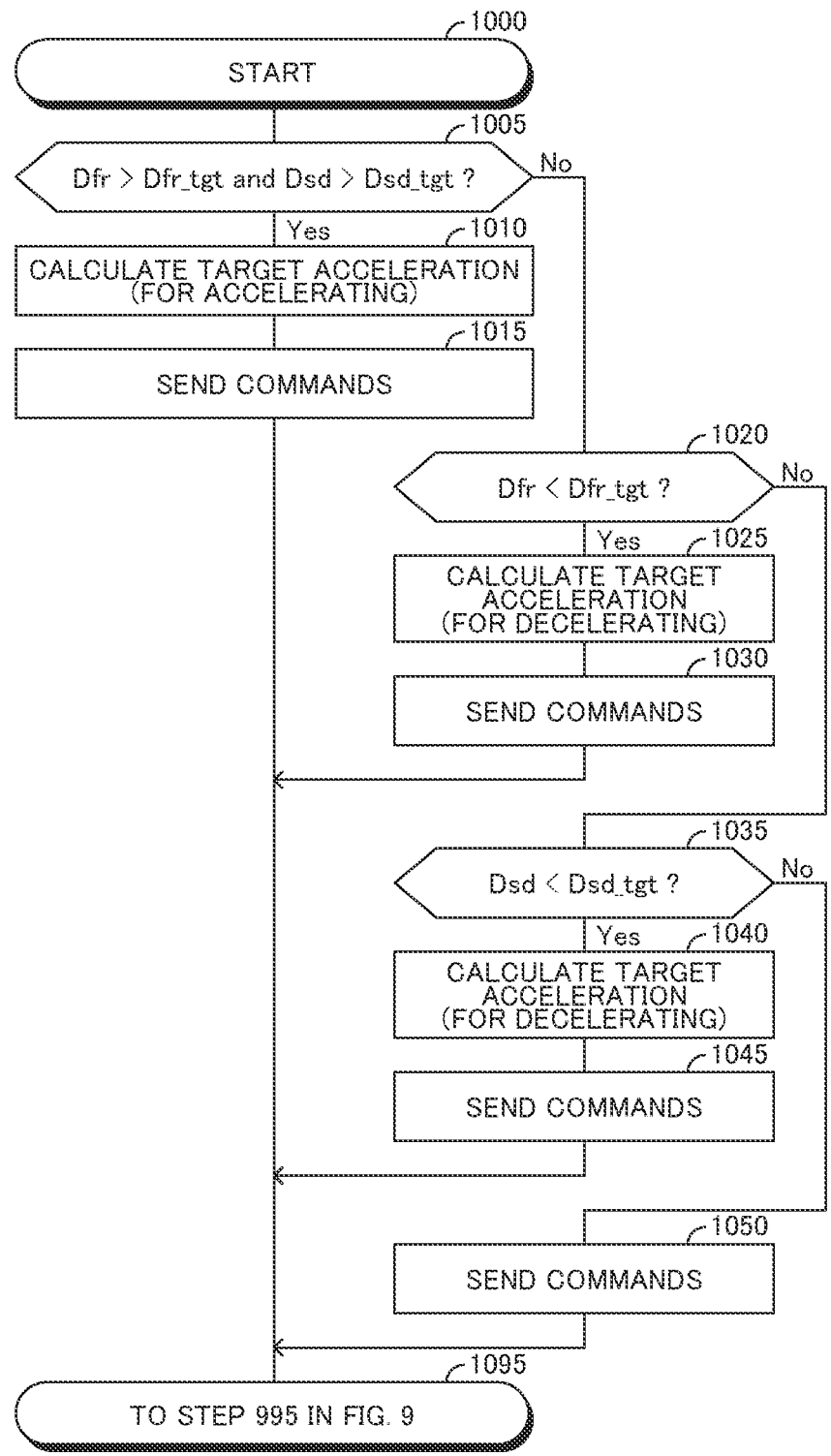
FIG. 10 is a view which shows a flowchart of a routine executed by the vehicle driving assist apparatus according to the embodiment of the invention.

When the CPU determines "Yes" at the step 920, the CPU proceeds with the process to a step 925 to execute a routine shown in FIG. 10. Therefore, when the CPU proceeds with the process to the step 925, the CPU starts executing a process from a step 1000 of the routine shown in FIG. 10 and proceeds with the process to a step 1005 to determine whether (i) the own lane inter-vehicle distance Dfr is longer than the target own lane inter-vehicle distance Dfr_tgt, and (ii) the next lane inter-vehicle distance Dsd is longer than the target next lane inter-vehicle distance Dsd_tgt.

When the CPU determines "Yes" at the step 1005, the CPU proceeds with the process to a step 1010 to calculate the target acceleration Gtgt as described above with reference to FIG. 5. Next, the CPU proceeds with the process to a step 1015 to send commands to the driving apparatus 21 and/or the braking apparatus 22 to control the activations of the driving apparatus 21 and/or the braking apparatus 22 so as to realize the target acceleration Gtgt calculated at the step 1010. Then, the CPU proceeds with the process to the step 995 of the routine shown in FIG. 9 via a step 1095 to terminate executing this routine once.

On the other hand, when the CPU determines "No" at the step 1005, the CPU proceeds with the process to a step 1020 to determine whether the own lane inter-vehicle distance Dfr is shorter than the target own lane inter-vehicle distance Dfr_tgt.

When the CPU determines "Yes" at the step 1020, the CPU proceeds with the process to a step 1025 to calculate the target acceleration Gtgt as described above with reference to FIG. 5. Next, the CPU proceeds with the process to a step 1030 to send commands to the driving apparatus 21 and/or the braking apparatus 22 to control the activations of the driving apparatus 21 and/or the braking apparatus 22 so as to realize the target acceleration Gtgt calculated at the step 1025. Then, the CPU proceeds with the process to the step 995 of the routine shown in FIG. 9 via the step 1095 to terminate executing this routine once.

On the other hand, when the CPU determines "No" at the step 1020, the CPU proceeds with the process to a step 1035 to determine whether the next lane inter-vehicle distance Dsd is shorter than the target next lane inter-vehicle distance Dsd_tgt.

When the CPU determines "Yes" at the step 1035, the CPU proceeds with the process to a step 1040 to calculate the target acceleration Gtgt as described above with reference to FIG. 5. Next, the CPU proceeds with the process to a step 1045 to send commands to the driving apparatus 21 and/or the braking apparatus 22 to control the activations of the driving apparatus 21 and/or the braking apparatus 22 so as to realize the target acceleration Gtgt calculated at the step 1040. Then, the CPU proceeds with the process to the step 995 of the routine shown in FIG. 9 via the step 1095 to terminate executing this routine once.

On the other hand, when the CPU determines "No" at the step 1035, the CPU proceeds with the process to a step 1050 to send commands to the driving apparatus 21 and/or the braking apparatus 22 to control the activations of the driving apparatus 21 and/or the braking apparatus 22 so as to maintain the current vehicle moving speed SPD. Then, the CPU proceeds with the process to the step 995 of the routine shown in FIG. 9 via the step 1095 to terminate executing this routine once.

Figure 11:
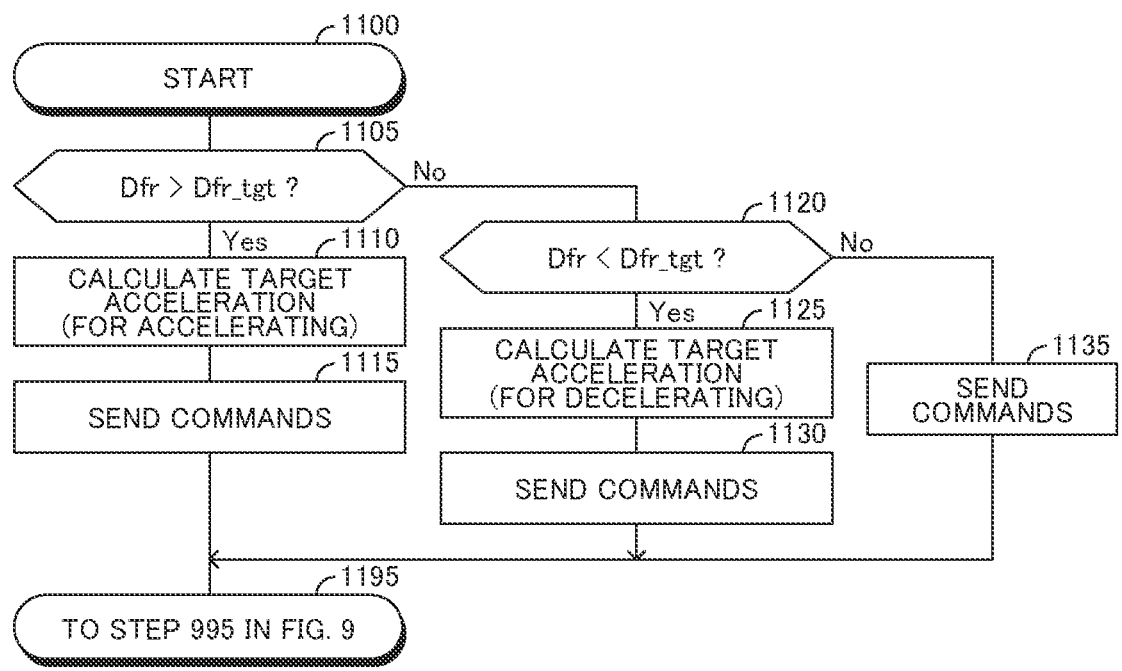
FIG. 11 is a view which shows a flowchart of a routine executed by the vehicle driving assist apparatus according to the embodiment of the invention.

When the CPU determines "No" at the step 920, the CPU proceeds with the process to a step 930 to execute a routine shown in FIG. 11. Therefore, when the CPU proceeds with the process to the step 930, the CPU starts executing a process from a step 1100 of the routine shown in FIG. 11 and proceeds with the process to a step 1105 to determine whether the own lane inter-vehicle distance Dfr is longer than the target own lane inter-vehicle distance Dfr_tgt.

When the CPU determines "Yes" at the step 1105, the CPU proceeds with the process to a step 1110 to calculate the target acceleration Gtgt as described above with reference to FIG. 2. Next, the CPU proceeds with the process to a step 1115 to send commands to the driving apparatus 21 and/or the braking apparatus 22 to control the activations of the driving apparatus 21 and/or the braking apparatus 22 so as to realize the target acceleration Gtgt calculated at the step 1110. Then, the CPU proceeds with the process to the step 995 of the routine shown in FIG. 9 via a step 1195 to terminate executing this routine once.

On the other hand, when the CPU determines "No" at the step 1105, the CPU proceeds with the process to a step 1120 to determine whether the own lane inter-vehicle distance Dfr is shorter than the target own lane inter-vehicle distance Dfr_tgt.

When the CPU determines "Yes" at the step 1120, the CPU proceeds with the process to a step 1125 to calculate the target acceleration Gtgt as described above with reference to FIG. 2. Next, the CPU proceeds with the process to a step 1130 to send commands to the driving apparatus 21 and/or the braking apparatus 22 to control the activations of the driving apparatus 21 and/or the braking apparatus 22 so as to realize the target acceleration Gtgt calculated at the step 1125. Then, the CPU proceeds with the process to the step 995 of the routine shown in FIG. 9 via the step 1195 to terminate executing this routine once.

On the other hand, when the CPU determines "No" at the step 1120, the CPU proceeds with the process to a step 1135 to send commands to the driving apparatus 21 and/or the braking apparatus 22 to control the activations of the driving apparatus 21 and/or the braking apparatus 22 so as to maintain the current vehicle moving speed SPD. Then, the CPU proceeds with the process to the step 995 of the routine shown in FIG. 9 via the step 1195 to terminate executing this routine once.

When the CPU determines "No" at the step 915, the CPU proceeds with the process to a step 935 to determine whether there is at least one next lane preceding vehicle 200S.

Figure 12:
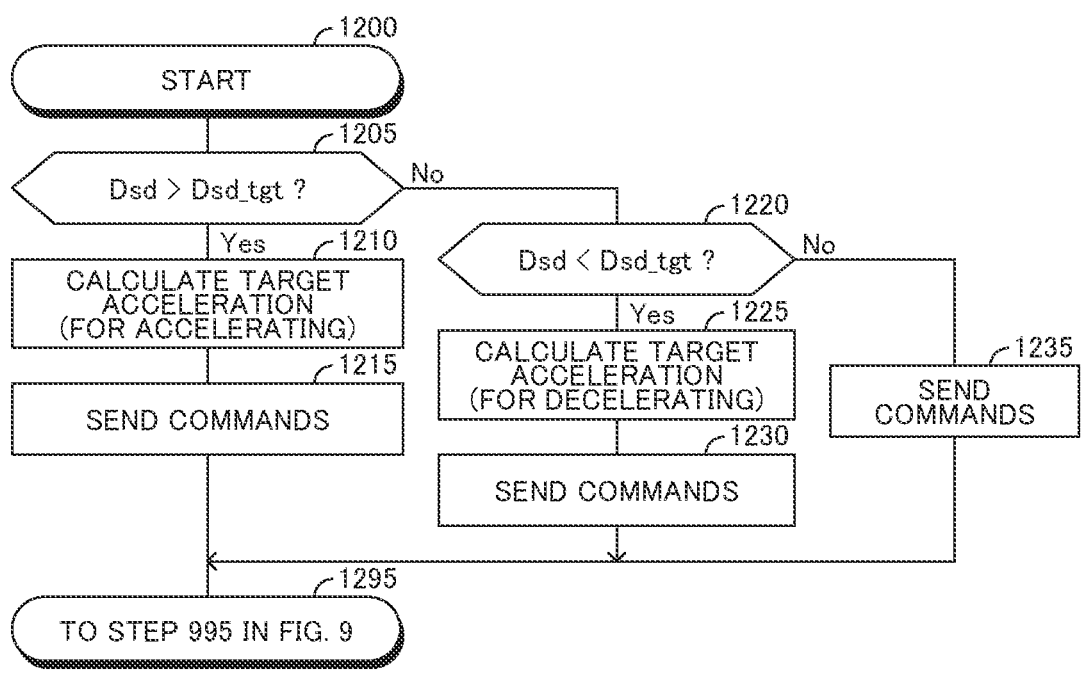
FIG. 12 is a view which shows a flowchart of a routine executed by the vehicle driving assist apparatus according to the embodiment of the invention.

When the CPU determines "Yes" at the step 935, the CPU proceeds with the process to a step 940 to execute a routine shown in FIG. 12. Therefore, when the CPU proceeds with the process to the step 940, the CPU starts executing a process from a step 1200 of the routine shown in FIG. 12 and proceeds with the process to a step 1205 to determine whether the next lane inter-vehicle distance Dsd is longer than the target next lane inter-vehicle distance Dsd_tgt.

When the CPU determines "Yes" at the step 1205, the CPU proceeds with the process to a step 1210 to calculate the target acceleration Gtgt as described above with reference to FIG. 3. Next, the CPU proceeds with the process to a step 1215 to send commands to the driving apparatus 21 and/or the braking apparatus 22 to control the activations of the driving apparatus 21 and/or the braking apparatus 22 so as to realize the target acceleration Gtgt calculated at the step 1210. Then, the CPU proceeds with the process to the step 995 of the routine shown in FIG. 9 via a step 1295 to terminate executing this routine once.

On the other hand, when the CPU determines "No" at the step 1205, the CPU proceeds with the process to a step 1220 to determine whether the next lane inter-vehicle distance Dsd is shorter than the target next lane inter-vehicle distance Dsd_tgt.

When the CPU determines "Yes" at the step 1220, the CPU proceeds with the process to a step 1225 to calculate the target acceleration Gtgt as described above with reference to FIG. 3. Next, the CPU proceeds with the process to a step 1230 to send commands to the driving apparatus 21 and/or the braking apparatus 22 to control the activations of the driving apparatus 21 and/or the braking apparatus 22 so as to realize the target acceleration Gtgt calculated at the step 1225. Then, the CPU proceeds with the process to the step 995 of the routine shown in FIG. 9 via the step 1295 to terminate executing this routine once.

On the other hand, when the CPU determines "No" at the step 1220, the CPU proceeds with the process to a step 1235 to send commands to the driving apparatus 21 and/or the braking apparatus 22 to control the activations of the driving apparatus 21 and/or the braking apparatus 22 so as to maintain the current vehicle moving speed SPD. Then, the CPU proceeds with the process to the step 995 of the routine shown in FIG. 9 via the step 1295 to terminate executing this routine once.

Figure 13:
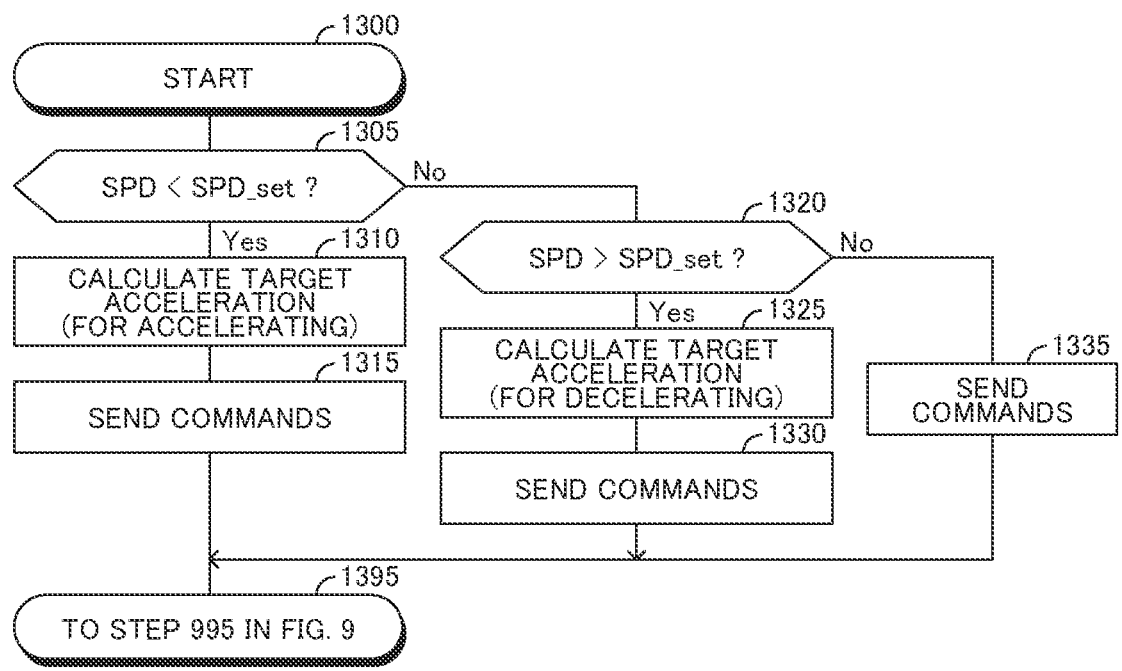
FIG. 13 is a view which shows a flowchart of a routine executed by the vehicle driving assist apparatus according to the embodiment of the invention.

When the CPU determines "No" at the step 935, the CPU proceeds with the process to a step 945 to execute a routine shown in FIG. 13. Therefore, when the CPU proceeds with the process to the step 945, the CPU starts executing a process from a step 1300 of the routine shown in FIG. 13 and proceeds with the process to a step 1305 to determine whether the vehicle moving speed SPD is lower than the set vehicle moving speed SPDset.

When the CPU determines "Yes" at the step 1305, the CPU proceeds with the process to a step 1310 to calculate the target acceleration Gtgt as described above with reference to FIG. 6. Next, the CPU proceeds with the process to a step 1315 to send commands to the driving apparatus 21 and/or the braking apparatus 22 to control the activations of the driving apparatus 21 and/or the braking apparatus 22 so as to realize the target acceleration Gtgt calculated at the step 1310. Then, the CPU proceeds with the process to the step 995 of the routine shown in FIG. 9 via a step 1395 to terminate executing this routine once.

On the other hand, when the CPU determines "No" at the step 1305, the CPU proceeds with the process to a step 1320 to determine whether the vehicle moving speed SPD is higher than the set vehicle moving speed SPDset.

When the CPU determines "Yes" at the step 1320, the CPU proceeds with the process to a step 1325 to calculate the target acceleration Gtgt as described above with reference to FIG. 6. Next, the CPU proceeds with the process to a step 1330 to send commands to the driving apparatus 21 and/or the braking apparatus 22 to control the activations of the driving apparatus 21 and/or the braking apparatus 22 so as to realize the target acceleration Gtgt calculated at the step 1325. Then, the CPU proceeds with the process to the step 995 of the routine shown in FIG. 9 via the step 1395 to terminate executing this routine once.

On the other hand, when the CPU determines "No" at the step 1320, the CPU proceeds with the process to a step 1335 to send commands to the driving apparatus 21 and/or the braking apparatus 22 to control the activations of the driving apparatus 21 and/or the braking apparatus 22 so as to maintain the current vehicle moving speed SPD. Then, the CPU proceeds with the process to the step 995 of the routine shown in FIG. 9 via the step 1395 to terminate executing this routine once.

When the CPU determines "No" at the step 905 or 910 of the routine in FIG. 9, the CPU proceeds with the process to a step 950 to calculate the requested acceleration Greq, based on the accelerator pedal operation amount AP. Next, the CPU proceeds with the process to a step 955 to send commands to the driving apparatus 21 and/or the braking apparatus 22 to control the activations of the driving apparatus 21 and/or the braking apparatus 22 so as to realize the requested acceleration Greq calculated at the step 950. Then, the CPU proceeds with the process to the step 995 to terminate executing this routine once.

Figure 14:
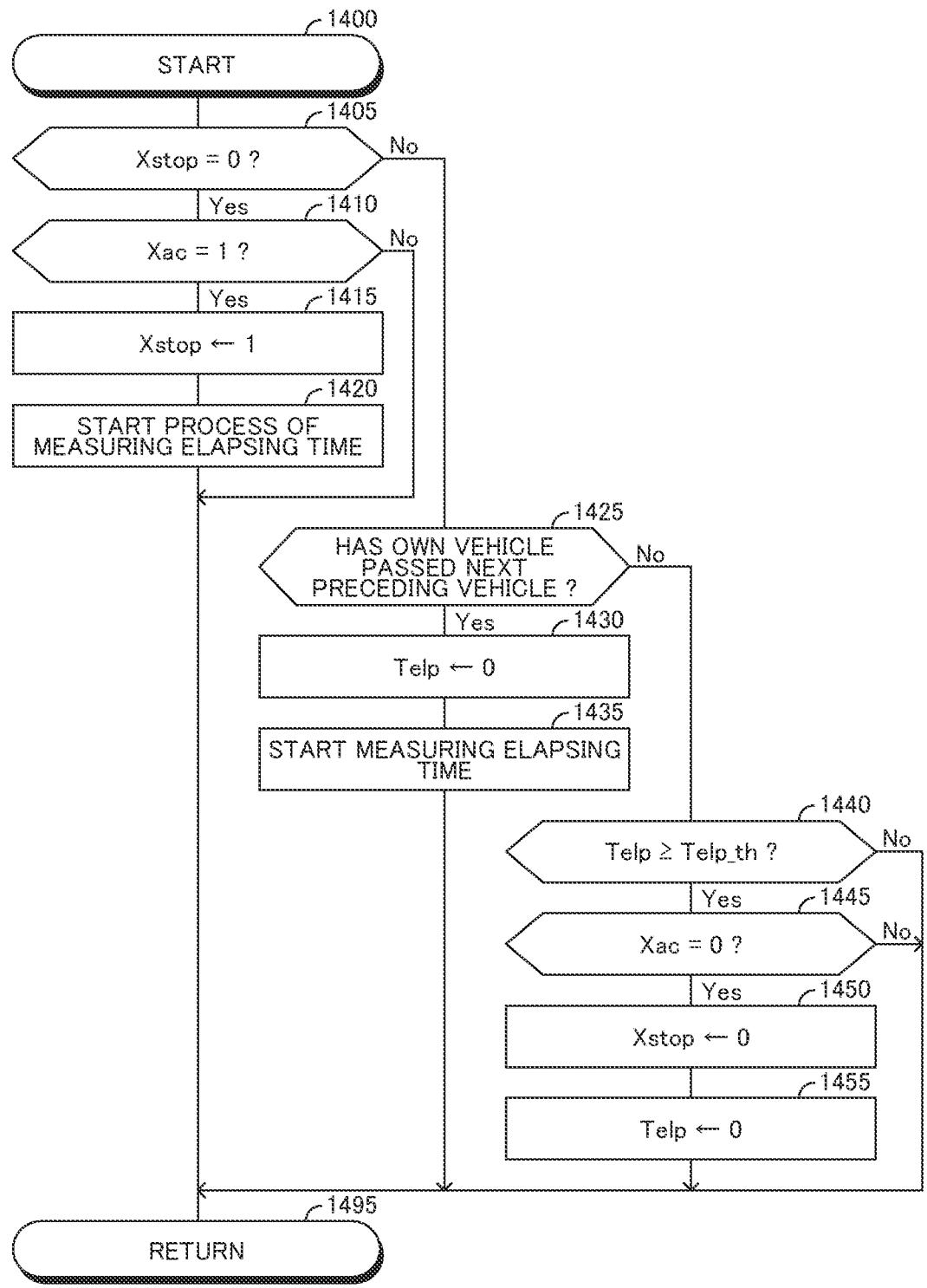
FIG. 14 is a view which shows a flowchart of a routine executed by the vehicle driving assist apparatus according to the embodiment of the invention.

Further, the CPU is configured or programmed to execute a routine shown in FIG. 14 each time the predetermined calculation time elapses. Therefore, at a predetermined timing, the CPU starts executing a process from a step 1400 of the routine shown in FIG. 14 and proceeds with the process to a step 1405 to determine whether the value of the control suspending flag Xstop is "0".

When the CPU determines "Yes" at the step 1405, the CPU proceeds with the process to a step 1410 to determine a value of an accelerating operation flag Xac is "1". The accelerating operation flag Xac is a flag which represents whether the accelerating operation is carried out. The value of the accelerating operation flag Xac is set to "1" when the accelerating operation is carried out. On the other hand, the value of the accelerating operation flag Xac is set to "0" when the accelerating operation is stopped.

When the CPU determines "Yes" at the step 1410, the CPU proceeds with the process to a step 1415 to set the value of the control suspending flag Xstop to "1". Thereby, the execution of the following moving control is suspended in the routine shown in FIG. 9. Next, the CPU proceeds with the process to a step 1420 to start the process of measuring the elapsing time Telp. Then, the CPU proceeds with the process to a step 1495 to terminate executing this routine once.

On the other hand, when the CPU determines "No" at the step 1410, the CPU proceeds with the process directly to the step 1495 to terminate executing this routine once.

When the CPU determines "No" at the step 1405, the CPU proceeds with the process to a step 1425 to determine whether the own vehicle 100 has passed the next lane preceding vehicle 200S.

When the CPU determines "Yes" at the step 1425, the CPU proceeds with the process to a step 1430 to reset the elapsing time Telp. Next, the CPU proceeds with the process to a step 1435 to start measuring the elapsing time Telp. Then, the CPU proceeds with the process to the step 1495 to terminate executing this routine once.

On the other hand, when the CPU proceeds with the process to a step 1440, the CPU determines whether the elapsing time Telp is longer than or equal to the predetermined time Telp_th.

When the CPU determines "Yes" at the step 1440, the CPU proceeds with the process to a step 1445 to determine whether the value of the accelerating operation flag Xac is "0".

When the CPU determines "Yes" at the step 1445, the CPU proceeds with the process to a step 1450 to set the value of the control suspending flag Xstop to "0". Thereby, the execution of the following moving control is restarted in the routine shown in FIG. 9. Next, the CPU proceeds with the process to a step 1455 to reset the elapsing time Telp. Then, the CPU proceeds with the process to the step 1495 to terminate executing this routine once.

On the other hand, when the CPU determines "No" at the step 1440 or 1445, the CPU proceeds with the process directly to the step 1495 to terminate executing this routine once.

One example of the specific operations of the vehicle driving assist apparatus 10 has been described.

It should be noted that the invention is not limited to the aforementioned embodiments, and various modifications can be employed within the scope of the invention.

MODIFIED EXAMPLES

For example, the vehicle driving assist apparatus 10 according to the embodiment executes the passing preventing following moving control when there is at least one next lane preceding vehicle 200S. However, the vehicle driving assist apparatus 10 may be configured to execute the passing preventing following moving control when (i) there is at least one next lane preceding vehicle 200S, (ii) the at least one next lane preceding vehicle 200S moves in the passing lane, and (iii) the own vehicle 100 moves in the cruising lane.

In this case, the control suspending condition Cstop includes (i) a condition that the following moving control is being executed, and the accelerating operation is carried out and (ii) a condition that the own vehicle 100 moves in the cruising lane, and the at least one next lane preceding vehicle 200S moves in the passing lane.

Further, in this case, the vehicle driving assist apparatus 10 executes the normal following moving control when (i) there is at least one next lane preceding vehicle 200S, and (ii) the at least one next lane preceding vehicle 200S moves in the cruising lane.

Further, the control suspending condition Cstop may include (i) the condition that the following moving control is being executed, and the accelerating operation is carried out and (ii) a traffic congestion of the next lane vehicles 200S occurs. Furthermore, the control suspending condition Cstop may include (i) the condition that the following moving control is being executed, and the accelerating operation is carried out, (ii) the own vehicle 100 moves in the cruising lane, and (iii) the next lane preceding vehicle 200S moves in the passing lane.

Further, a condition that the own vehicle 100 moves on the express road may be added to a condition of executing the following moving control.

The invention claimed is:

1. A vehicle driving assist apparatus, comprising an electronic control unit which (i) executes a following moving control of executing a process of detecting a next lane preceding vehicle which moves ahead of an own vehicle in a lane next to a lane in which the own vehicle moves, and (ii) autonomously controlling a moving speed of the own vehicle so as to maintain a distance between the next lane preceding vehicle and the own vehicle at a predetermined next lane inter-vehicle distance, wherein the electronic control unit is configured to:
   suspend executing the following moving control and starts executing a process of measuring an elapsing time which elapses since the electronic control unit suspends executing the following moving control when a control suspending condition that a driver of the own vehicle carries out an accelerating operation of accelerating the own vehicle in order to pass the next lane preceding vehicle, becomes satisfied;
   reset the elapsing time and start measuring the elapsing time which elapses since the electronic control unit resets the elapsing time when the own vehicle has passed the next lane preceding vehicle before the elapsing time reaches a predetermined time; and
   restart executing the following moving control when a control restarting condition that the elapsing time reaches the predetermined time, is satisfied.

2. The vehicle driving assist apparatus as set forth in claim 1, wherein the control suspending condition includes a condition that (i) the own vehicle moves in a cruising lane, and (ii) the next lane preceding vehicle moves in a passing lane.

3. The vehicle driving assist apparatus as set forth in claim 1, wherein the control suspending condition includes a condition that a traffic congestion of the next lane preceding vehicles occurs.

4. The vehicle driving assist apparatus as set forth in claim 1, wherein the control restarting condition includes a condition that the accelerating operation is not carried out.

5. The vehicle driving assist apparatus as set forth in claim 1, wherein the electronic control unit is configured to:
   execute a process of detecting an own lane preceding vehicle which moves ahead of the own vehicle in the lane in which the own vehicle moves when the electronic control unit is executing the following moving control; and
   execute the following moving control to autonomously control the moving speed of the own vehicle so as to maintain a distance between the own lane preceding vehicle and the own vehicle at a predetermined own lane inter-vehicle distance when (i) there is not the next lane preceding vehicle, and (ii) there is the own lane preceding vehicle.

6. The vehicle driving assist apparatus as set forth in claim 1, wherein the electronic control unit is configured to:
   execute a process of detecting an own lane preceding vehicle which moves ahead of the own vehicle in the lane in which the own vehicle moves when the electronic control unit is executing the following moving control;
   execute the following moving control to autonomously accelerate the own vehicle when (i) there is the next lane preceding vehicle, (ii) there is the own lane preceding vehicle, (iii) a distance between the own lane preceding vehicle and the own vehicle is longer than a predetermined own lane inter-vehicle distance, and (iv) the distance between the next lane preceding vehicle and the own vehicle is longer than the predetermined next lane inter-vehicle distance; and
   execute the following moving control to autonomously decelerate the own vehicle when (i) there is the next lane preceding vehicle, (ii) there is the own lane preceding vehicle, and (iii) the distance between the own lane preceding vehicle and the own vehicle is shorter than the predetermined own lane inter-vehicle distance, or (iv) the distance between the next lane preceding vehicle and the own vehicle is shorter than the predetermined next lane inter-vehicle distance.

7. The vehicle driving assist apparatus as set forth in claim 1, wherein the control suspending condition includes a condition that the own vehicle moves on an express highway.

* * * * *